(12) United States Patent
Goto

(10) Patent No.: US 8,174,607 B2
(45) Date of Patent: May 8, 2012

(54) IMAGE PICKUP DEVICE

(75) Inventor: Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 352 days.

(21) Appl. No.: 12/590,588

(22) Filed: Nov. 9, 2009

(65) Prior Publication Data
US 2010/0149389 A1 Jun. 17, 2010

(30) Foreign Application Priority Data
Nov. 27, 2008 (JP) ................................. 2008-301912

(51) Int. Cl.
H04N 5/232 (2006.01)
H04N 5/225 (2006.01)
G03B 13/34 (2006.01)

(52) U.S. Cl. .................... 348/345; 348/360; 396/121

(58) Field of Classification Search .................. 348/273, 348/280, 340, 345, 360; 396/93, 104, 121; 359/733, 759
See application file for complete search history.

(56) References Cited

U.S. PATENT DOCUMENTS

| | | | |
|---|---|---|---|
| 6,239,912 B1 * | 5/2001 | Ozawa | 359/618 |
| 6,346,694 B1 * | 2/2002 | Kimba et al. | 250/201.4 |
| 6,393,219 B1 * | 5/2002 | Sensui | 396/114 |
| 7,745,772 B2 * | 6/2010 | Utagawa | 250/208.1 |
| 2004/0125230 A1 * | 7/2004 | Suda | 348/345 |
| 2007/0125230 A1 * | 6/2007 | Powell et al. | 95/210 |

FOREIGN PATENT DOCUMENTS

JP 01-266503 10/1989

* cited by examiner

Primary Examiner — Trung Diep
(74) Attorney, Agent, or Firm — Kenyon & Kenyon LLP

(57) ABSTRACT

An image pickup device includes an image pickup element that receives light of an object image formed by a picture-taking lens; and a focus detection filter section that is so disposed near the image pickup element and on the side of the picture-taking lens as to be able to be inserted or withdrawn. The focus detection filter section, from the side of the picture-taking lens, includes a field diaphragm that includes a plurality of openings; a condenser lens disposed near a focus detection area on the surface of the field diaphragm; a pupil division diaphragm that corresponds to the opening of the field diaphragm and includes a pair of openings arranged at such an interval as to secure focusing accuracy; and a re-imaging lens group that includes a plurality of re-imaging lenses that are so arranged as to correspond to the openings of each of the pupil division diaphragms. When the focus detection filter section is inserted into an picture-taking optical path, the light intensity distribution of two light beams that each pass through different areas of the picture-taking lens and the openings of the field diaphragm is received by the image pickup element. The detecting of focus is performed by detecting a phase difference of an output signal representing the light intensity distribution obtained from the image pickup element. When a picture is taken, the focus detection filter section withdraws from the optical path.

9 Claims, 16 Drawing Sheets

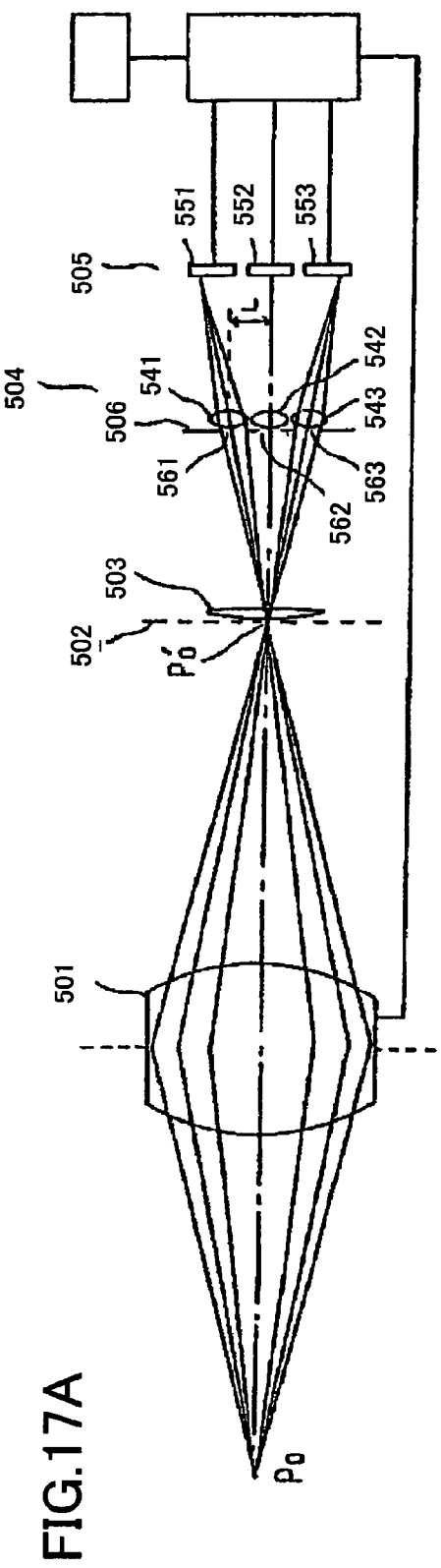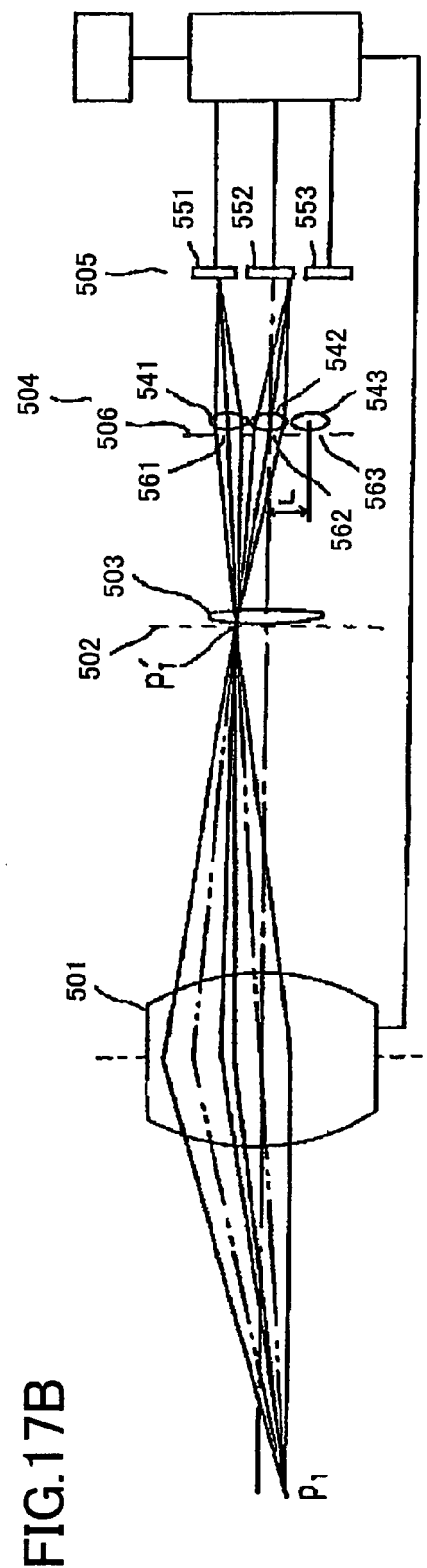
FIG.17A Prior Art
FIG.17B

IMAGE PICKUP DEVICE

BACKGROUND OF THE INVENTION

The present invention relates to an image pickup device and particularly to an image pickup device that uses a so-called phase-difference autofocus (AF) system.

Conventionally, a focus detection system, like the one disclosed in JP-A-1-266503, is well known. According to JP-A-1-266503, as shown in FIGS. 17A and 17B, the focus detection system is disposed on an optical path that passes through a picture-taking lens 501 and a quick return mirror, a half mirror, or the like (not shown). In the focus detection system, there are provided a planned imaging plane 502 of the picture-taking lens 501, and a field lens 503 disposed near the planned imaging plane 502. Moreover, a secondary optical system 504 (a re-imaging lens group) that includes secondary imaging lenses 541, 542, and 543. The secondary imaging lens 542 is so disposed as to be aligned with the optical axis of the imaging lens 501. The secondary imaging lenses 541 and 543 are so disposed as to be symmetrical about the optical axis of a picture-taking objective lens 1. A light receiving means 505 includes three light receiving element rows 551, 552, and 553. The three light receiving element rows 551, 552, and 553 are so disposed as to correspond to three secondary imaging lenses 541, 542, and 543. An aperture diaphragm 506 includes three openings 561, 562, and 563. The three openings 561, 562, and 563 are so disposed as to correspond to the secondary imaging lenses 541, 542, and 543. An exit pupil 507 of the picture-taking lens 501 is divided into three by the field lens 503 and the like.

In the focus detection system, a primary imaging plane (the planned imaging plane 502) is provided at a position that is substantially equivalent to an image pickup plane. A field diaphragm is disposed near the primary imaging plane to form a focus detection area. A condenser lens (the field lens 503) is disposed near the primary imaging plane. A brightness diaphragm (the aperture diaphragm 506) performs pupil division by using a plurality of openings. A plurality of re-imaging lenses (secondary imaging lenses) and light receiving element rows (the light receiving means 505) are each disposed according to the corresponding brightness diaphragm. Moreover, the condenser lens separately projects different areas of the picture-taking lens on the brightness diaphragm. Moreover, the re-imaging lenses projects an aerial image that exists at the position of primary imaging on the light receiving element rows through the corresponding brightness diaphragm.

In order to carry out detection for each of a plurality of focus detection areas, the focus detection system includes a pair of re-imaging lenses for each of the focus detection areas. The focus detection system uses one re-imaging lens for re-imaging of a plurality of focus detection areas.

As shown in FIGS. 17A and 17B, in the focus detection system, three focus detection areas line up in one direction on the surface of the field diaphragm. Moreover, in the focus detection system, a re-imaging lens group 504 including a pair of re-imaging lenses is so provided as to correspond to each of the focus detection areas. The re-imaging lens group 504 includes three re-imaging lenses 541, 542, and 543 that line up in one direction. The outer re-imaging lenses 541 and 543 both correspond to the central focus detection area and detect a focus. Moreover, one outer re-imaging lens 541 and the central re-imaging lens 542 correspond to the outer focus detection area and detect a focus. It is also disclosed that the focus detection system can be similarly disposed in a direction perpendicular to the plane of paper.

FIG. 18 illustrates a configuration aimed at making the focus detection system thinner and expanding a distance measurement area. According to the configuration illustrated in FIG. 18, a picture-taking optical system 201, a field diaphragm surface 202 that exists at a position equivalent to the image pickup plane, a field diaphragm 203 set near the field diaphragm surface 202, a condenser lens 204 disposed near the field diaphragm surface 202, a brightness diaphragm 205 disposed away from the condenser lens 204, a re-imaging lens group 206 disposed near the brightness diaphragm 205, and a light receiving member 207 corresponding to the re-imaging lens group 206 are disposed in that order from the object-of-shooting side.

The field diaphragm 203 includes an opening (also referred to as a field opening, hereinafter). Thanks to the field opening, a focus detection area is set. Moreover, the brightness diaphragm 205 is to perform pupil division and can be referred to as a pupil division diaphragm. The brightness diaphragm 205 includes a plurality of openings $205_{a1}$ to $205_{a3}$ and $205_{b1}$ to $205_{b3}$ (also referred to as pupil division diaphragm openings, hereinafter). Moreover, the re-imaging lens group 206 includes a plurality of re-imaging lenses $206_{a1}$ to $206_{a3}$ and $206_{b1}$ to $206_{b3}$. Moreover, the light receiving member 207 includes a plurality of photoelectric conversion sections $207_{a1}$ to $207_{a3}$ and $207_{b1}$ to $207_{b3}$. The photoelectric conversion sections each include a plurality of photoelectric conversion elements (light receiving elements). The photoelectric conversion elements (light receiving elements) are arranged in the same direction as the pupil division diaphragm openings are arranged.

Among the above components, the field diaphragm 203 (field openings), the condenser lens 204, the brightness diaphragm 205, the re-imaging lens group 206, and the light receiving member 207 are collectively referred to as a focus detection system in general.

In the focus detection system illustrated in FIG. 18, in order to realize the above object, the field diaphragm is formed by three field openings, and a member for detecting a focus is disposed for each of the field openings. In FIG. 18, virtual regions $208_a$ and $208_b$ are planned in the picture-taking lens 201. The field diaphragm 203 is disposed near the field diaphragm surface 202.

The field diaphragm 203 is formed by the field openings $203_1$, $203_2$, and $203_3$. The pupil division diaphragm openings $205_{a1}$ to $205_{b3}$, the re-imaging lenses $206_{a1}$ to $206_{b3}$, and the photoelectric conversion sections $207_{a1}$ to $207_{a3}$ are so disposed as to correspond to the individual field openings $203_1$, $203_2$, and $203_3$.

Moreover, the condenser lens $204_1$ is disposed near the field opening $203_1$. The pupil division diaphragm opening $205_{a1}$ is disposed at a conjugated position of the virtual region $208_a$ by the condenser lens $204_1$. The re-imaging lens $206_{a1}$ is disposed near the pupil division diaphragm opening $205_{a1}$. The re-imaging lens $206_{a1}$ projects on the photoelectric conversion surface $207_{a1}$ an image formed on the field opening $203_1$ through the condenser lens $204_1$ and the pupil division diaphragm opening $205_{a1}$.

Similarly, the necessary structure for focus detection is realized by a combination of the virtual region $208_b$, the field opening $203_1$, the condenser lens $204_1$, the pupil division diaphragm opening $205_{b1}$, the re-imaging lens $206_{b1}$, and the photoelectric conversion surface $207_{b1}$, a combination of the virtual region $208_a$, the field opening $203_2$, the condenser lens $204_2$, the pupil division diaphragm opening $205_{a2}$, the re-imaging lens $206_{a2}$, and the photoelectric conversion surface $207_{a2}$, a combination of the virtual region $208_b$, the field opening $203_2$, the condenser lens $204_2$, the pupil division diaphragm opening $205_{b2}$, the re-imaging lens $206_{b2}$, and the photoelectric conversion surface $207_{b2}$, a combination of the virtual region $208_a$, the field opening $203_3$, the condenser lens $204_3$, the pupil division diaphragm opening $205_{a3}$, the re-imaging lens $206_{a3}$, and the photoelectric conversion surface $207_{a3}$, and a combination of the virtual region $208_b$, the field opening $203_3$, the condenser lens $204_3$, the pupil division diaphragm opening $205_{b3}$, the re-imaging lens $206_{b3}$, and the photoelectric conversion surface $207_{b3}$.

SUMMARY OF THE INVENTION

An image pickup device preferably includes: a picture-taking lens; an image pickup element that receives light of an object image formed by the picture-taking lens; and a focus detection filter section. The focus detection filter section includes, from the side of the picture-taking lens in the following order, a field diaphragm that includes a plurality of first openings, a condenser lens disposed near the field diaphragm, a pupil division diaphragm that includes a plurality of second openings arranged at such intervals as to secure focusing accuracy, and a re-imaging lens group that includes a plurality of re-imaging lenses that are so arranged as to correspond to the second openings. The field diaphragm is disposed at a substantially conjugated position with the image pickup element. A plurality of the first openings is so formed as to allow two light beams that each pass through different areas of the picture-taking lens to enter the different re-imaging lenses after passing through the different first openings. The focus detection filter section is so disposed near the image pickup element and on an optical path between the picture-taking lens and the image pickup element as to be able to be inserted and withdrawn. The focus detection filter section is inserted into the optical path when a focus is detected and is withdrawn from the optical path when a picture is taken.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 17A and 17B are diagrams illustrating a conventional focus detection system.

DESCRIPTION OF EXEMPLARY EMBODIMENTS

Figure 1:
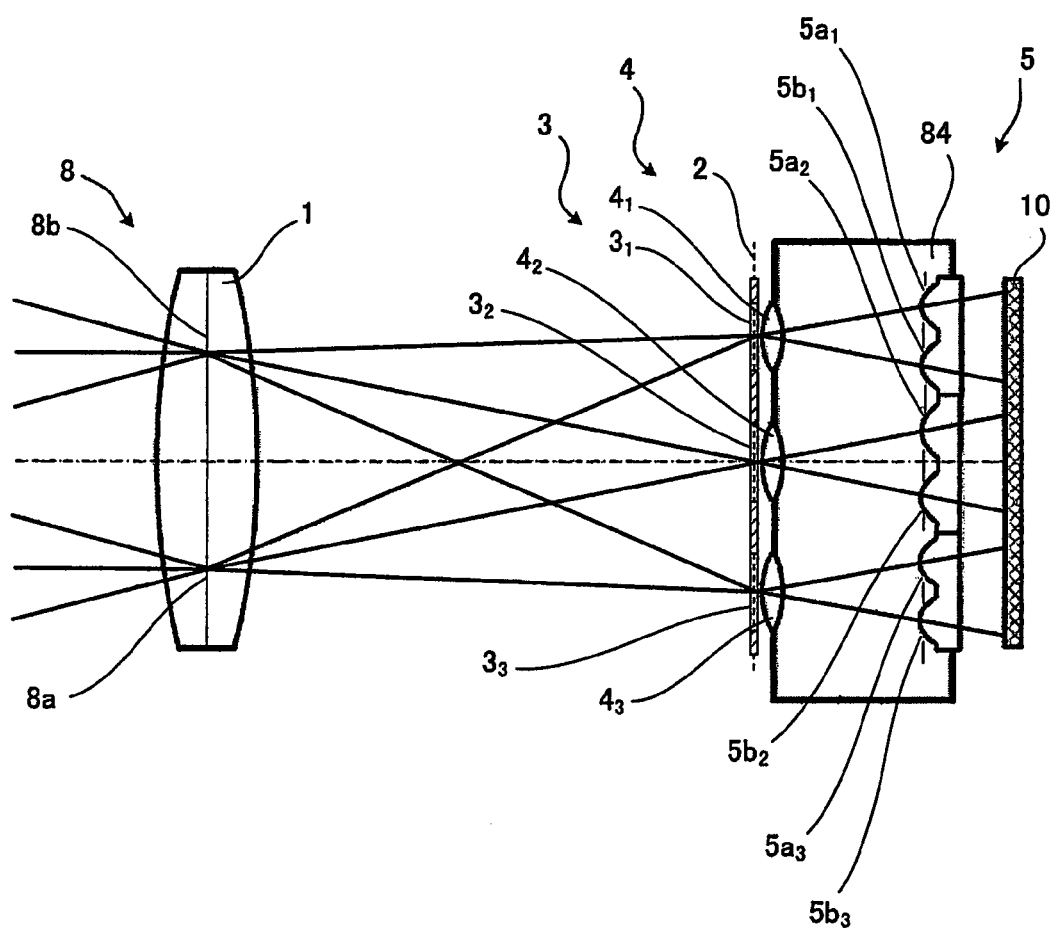
FIG. 1 is a diagram illustrating a first embodiment of the present invention.

An image pickup device according to an embodiment of the present invention will be described. According to the present embodiment, the image pickup device includes a picture-taking lens, an image pickup element that receives light of an object image produced by the picture-taking lens, and a focus detection filter section. The focus detection filter section includes, from the side of the picture-taking lens, a field diaphragm disposed at a substantially conjugated position with the image pickup element and including a plurality of first openings, a condenser lens disposed near the field diaphragm, a pupil division diaphragm including a plurality of second openings arranged at such intervals as to secure focusing accuracy, and a re-imaging lens group having a plurality of re-imaging lenses which are so arranged as to correspond to the second openings. A plurality of the first openings are so formed as to allow the two light beams that have each passed through the different areas of the picture-taking lens to pass through the different first openings and then enter the different re-imaging lenses. The focus detection filter section is disposed on an optical path between the picture-taking lens and the image pickup element and near the image pickup element such that the focus detection filter section can be inserted and withdrawn. When a focus is detected, the focus detection filter section is inserted into the optical path. When a picture is taken; the focus detection filter section is withdrawn from the optical path.

In that manner, the focus detection filter section is inserted into the picture-taking optical path. Therefore, the optical path and the light receiving element can be shared for taking pictures and auto focus. It is desirable that the distance between the field diaphragm and the image pickup element (imaging plane) be as small as possible. It is important that the distance between the field diaphragm and the image pickup element does not cause the images of the first openings to interfere (overlap) with one another on the sensor. Therefore, the size of the openings is a key factor in determining the distance between the field diaphragm and the image pickup element. A plurality of the first openings can make each of the openings smaller in size. As a result, the distance between the field diaphragm and the image pickup element (imaging plane) is made smaller. Moreover, the field diaphragm and the image pickup element are made smaller in size.

The field diaphragm has the first openings that are arranged side by side: the number of the first openings is at least n (n≧2). The re-imaging lens group includes the n+1 re-imaging lenses. The n−1th and nth re-imaging lenses correspond to the n−1th first opening and are arranged side by side in a pair. The nth and n+1th re-imaging lenses correspond to the nth first opening and are arranged side by side in a pair. It is desirable that the n−1th re-imaging lens and the n+1th re-imaging lens be disposed at different positions.

The first openings each play a role as the field diaphragm. However, the first openings also play a role in determining a focus detection area. Accordingly, if the number of the first openings is n (n≧2), the number of focus detection areas is n. Since a pair of adjacent re-imaging lenses corresponds to one first opening, a pair of adjacent re-imaging lenses corresponds to each of the focus detection areas. In that manner, the re-imaging lenses are arranged side by side. Therefore, the incident angle of the light beam entering the re-imaging lens and aberration are easily suppressed even as the distance between the focus detection area and the re-imaging lens is made small.

Especially, it is desirable that the above-described nth and n+1th re-imaging lenses be so disposed as to correspond to the nth focus detection area, because a focus can be detected in the n focus detection areas by the n+1 re-imaging lenses. Therefore, the configuration of the focus detection system is simplified, and it becomes easier to reduce the distance between the field diaphragm and the image pickup element. Moreover, it is not necessary to make the focus detection structure independent of each focus detection area. Therefore, it becomes easier to make the focus detection areas closer to each other. Thus, it is possible to assume that a plurality of field openings arranged side by side form one distance measurement area. Therefore, the detecting of focus to be performed here is substantially equal in performance to the case in which one distance measurement area is used.

Moreover, as for one focus detection area, a pair of re-imaging lenses is arranged side by side. Therefore, it becomes easier to prevent a light beam from entering the same light receiving element row from a plurality of (other) focus detection areas. In this case, it is not necessary to dispose a light shielding member between the aperture diaphragm and the re-imaging lens group, thereby contributing to making the focus detection system thinner.

Thanks to the above configuration, the structure of the pupil division diaphragm and the re-imaging lens group can be simplified. In addition, it becomes easier to make the focus detection areas closer to each other even as there is a plurality of focus detection areas. It is also possible to bring the re-imaging lens group closer to the focus detection areas.

Therefore, provided is the focus detection system that is simple and thin in configuration and can secure a required focus detection capability. Another advantage is that the structure for inserting and withdrawing the focus detection filter section is simplified.

Besides the above field diaphragm, there is another field diaphragm, which is equipped with at least n (n≧2) first openings arranged side by side and is preferably arranged in parallel to the above field diaphragm.

Therefore, it is possible to expand the focus detection area. In addition, a focus detection output that is based on the first openings of a plurality of aperture diaphragms is also evaluated. Therefore, it is possible to steadily and accurately detect a focus.

Moreover, besides the above field diaphragm, there is another field diaphragm, which is equipped with at least n (n≧2) first openings arranged side by side and is preferably so arranged as to lie at right angles to the above field diaphragm.

Since the focus detection areas are so provided in two directions as to lie at right angles to each other, it is possible to focus on a variety of objects.

The configuration is preferably so designed as to prevent the image of the first opening projected by the re-imaging lens on the image pickup element from interfering with the image of the other first opening when a focus is detected.

As for each of a plurality of the first openings, an image is projected by a pair of the corresponding re-imaging lenses. In such a case, the accuracy in focus detection can be secured by preventing the image of one first opening from interfering with the image of the other first opening.

It is desirable that the projection magnifying power be less than or equal to ½ and more preferably less than or equal to ⅓.

Moreover, it is desirable that the focus detection filter section be a member in the shape of a plate and that a space between the condenser lens and the re-imaging lens is filled with a transparent material.

Since the focus detection filter section is substantially in the shape of one plate, it is easier to insert and withdraw the focus detection filter section into and from the optical path.

Moreover, the image pickup element includes a color filter having at least three Colors. It is desirable that the size of the image of the field diaphragm projected on the image pickup element include the size of the color filter having at least three colors.

Based on the light beam from one first opening, all color information can be reproduced. That is, the effect of chromatic aberration can be taken into consideration at the time of detecting a focus thanks to the use of all the color information. Therefore, it is possible to steadily detect a focus.

When a focus is detected, the detecting of focus is preferably carried out by selectively using output signals from the image pickup element in accordance with the positional correlation between the focus detection filter section and the image pickup element.

For example, a pixel corresponding to each of the field diaphragm is selected each time the focus detection filter is inserted. Therefore, even if the insertion position of the focus detection filter varies, the impact on focus detection can be suppressed. Accordingly, even if the inserting and withdrawing of the focus detection filter section are not strictly accurate, it is possible to steadily detect a focus.

Moreover, it is desirable that the image pickup device be equipped with a display for displaying, and that the output from the image pickup element be displayed on the display both when the focus detection filter section is inserted into the optical path and when the focus detection filter section is withdrawn from the optical path.

Accordingly, after the focus detection filter section is inserted into the optical path, the number of pixels that can be displayed (equivalent to the number of field diaphragms) decreases. However, if the number of pixels to be displayed (0.3M and the like) is smaller than the number of picture-taking pixels (10M and the like), it is possible to display the object. Therefore, thanks to the above configuration, framing is possible even at the time of detecting a focus.

Moreover, it is desirable that within one second after image signals are output from the image pickup element, the image be displayed based on the image signals.

If it takes more than one second to display the image after the image signals are output from the image pickup element, a method of just displaying the image before the focus detection filter section is inserted could be more effective.

Furthermore, it is desirable that the number of the first openings be greater than or equal to 70,000 and that the number of pixels of the image pickup elements be 36 or more times as many as the number of the first openings.

The number of the first openings of the field diaphragm affects the resolution of framing images. Considering the above fact, it is desirable that the number of the first openings of the field diaphragm be greater than or equal to 70,000 and that the number of pixels of the image pickup elements be 36 or more times as many as the number of the field openings. Therefore, it becomes easier to compensate the color information and a change in position between the focus detection filter section and the image pickup plane. The resolution of the framing images here is the resolution of the display when the focus detection filter is inserted. 70,000 pixels are substantially equivalent to QVGA and 0.3M pixels to VGA.

Hereinafter, embodiments of the present invention will be described. FIG. 1 illustrates an image pickup device according to a first embodiment of the present invention. In FIG. 1, a field diaphragm 3, a condenser lens 4, a pupil division diaphragm 5, and a re-imaging lens group 6 have the same configuration as those illustrated in FIG. 18. FIG. 1 also illustrates a field diaphragm surface 2 and virtual regions 8a and 8b on a picture-taking lens 1.

First openings $3_1$, $3_2$ and $3_3$ are equivalent to the openings (field openings) of the field diaphragm 3. The reference numerals $4_1$, $4_2$, and $4_3$ denote condenser lenses. Second openings $5a_1$, $5a_2$, $5a_3$, $5b_1$, $5b_2$, and $5b_3$ are equivalent to the openings of the pupil division diaphragm 5.

In the image pickup device of the present embodiment, an image pickup element 10 is used instead of the photoelectric conversion section illustrated in FIG. 20. Moreover, the condenser lens 4 and the re-imaging lens group 6 work as one unit to form a focus detection filter 84. The focus detection filter 84 is designed to be inserted into and withdrawn from a picture-taking optical path. The condenser lens 4 and the re-imaging lens group 6 may be separately inserted into and withdrawn from the picture-taking optical path. However, with the condenser lens 4 and the re-imaging lens group 6 working as one unit, it is easier to maintain the positional correlation therebetween at the time of insertion and withdrawal. In that manner, in the image pickup device of the first embodiment, the focus detection filter 84 is inserted into and withdrawn from the picture-taking optical path, allowing the image pickup element 10 to detect a focus.

Figure 2:
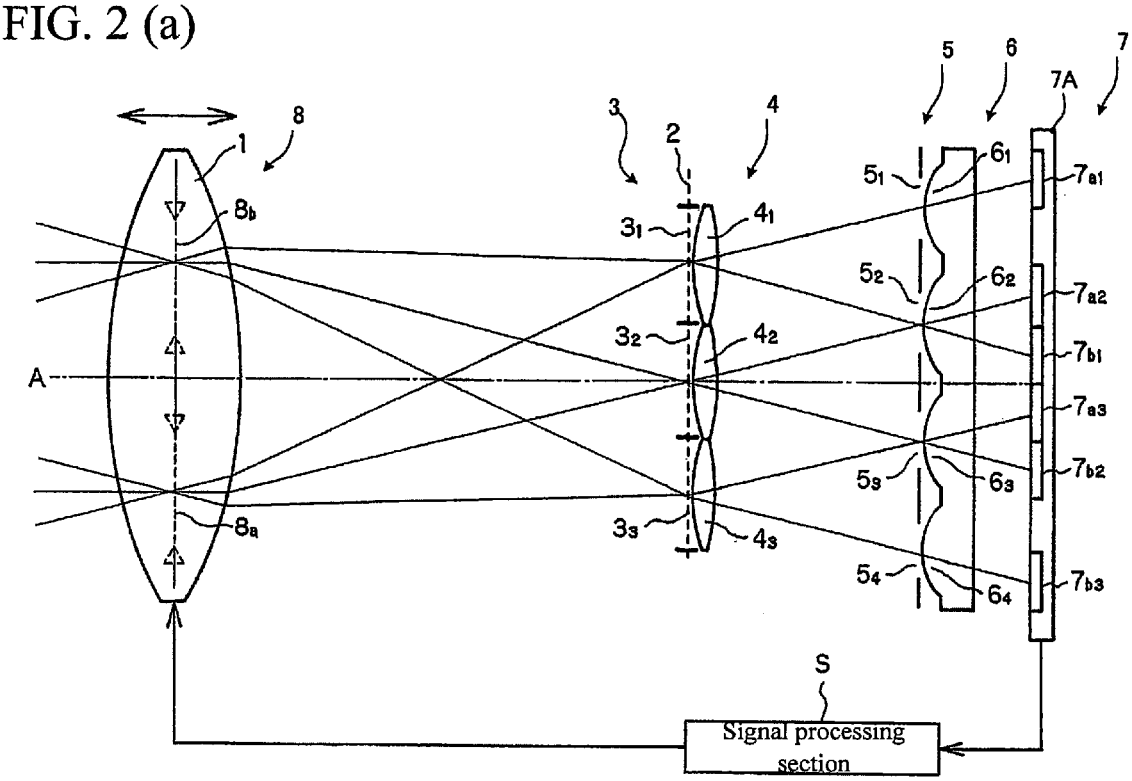
FIGS. 2A and 2B are diagrams illustrating a second embodiment of the present invention.
Figure 2:
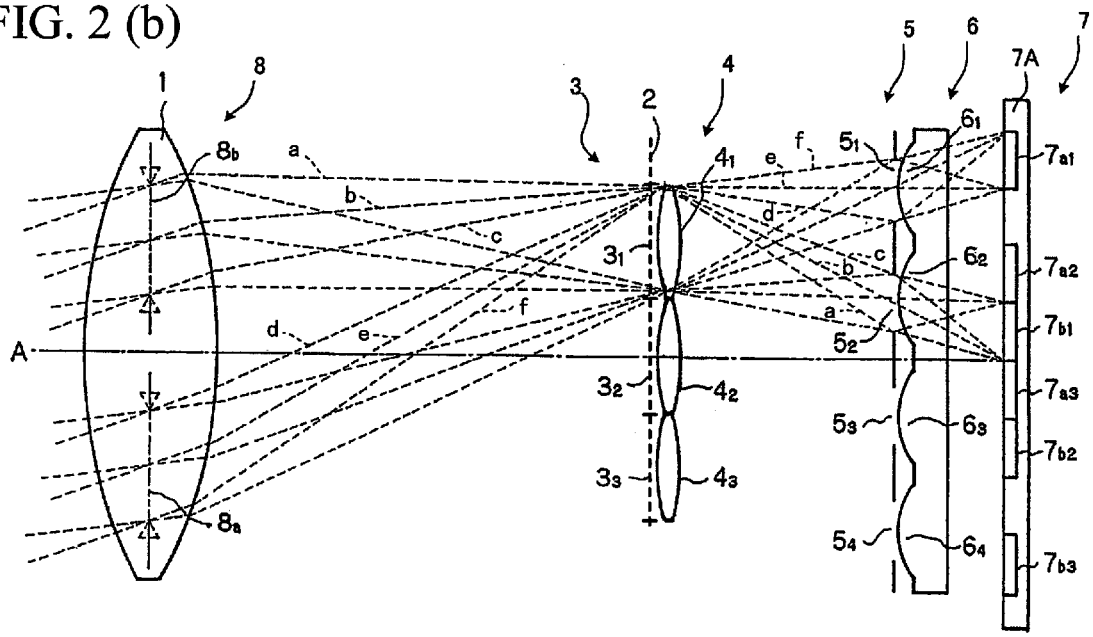

FIGS. 2A and 2B illustrate the configuration of an image pickup device according to a second embodiment of the present invention.

In FIGS. 2A and 2B, like the case illustrated in FIG. 1, a field diaphragm 3 is disposed near a field diaphragm surface 2.

The openings $3_1$, $3_2$, and $3_3$ of the field diaphragm 3 are arranged in a line. The openings $3_1$, $3_2$, and $3_3$ are field openings forming focus detection areas. The condenser lenses 4 ($4_1$, $4_2$, and $4_3$), the openings ($5_1$, $5_2$, $5_3$, and $5_4$) of the pupil division diaphragm 5, and the re-imaging lens group 6 ($6_1$, $6_2$, $6_3$, and $6_4$) are so arranged in the same direction as to correspond to the field openings $3_1$, $3_2$, and $3_3$. A photoelectric conversion surface 7 is disposed at a conjugated position with the field diaphragm surface 2. The photoelectric conversion surface 7 includes light receiving element rows ($7a_1$, $7a_2$, $7a_3$, $7b_1$, $7b_2$, and $7b_3$) provided on a light receiving member 7A. The direction in which the light receiving element rows are arranged is the same as that of each lens of the re-imaging lens group 6.

The condenser lens $4_1$ is disposed near the field opening $3_1$. The light beams from the virtual regions $8_a$ and $8_b$ pass through the field opening $3_1$ and the condenser lens $4_1$. The opening $5_1$ of the pupil division diaphragm 5 is disposed at a conjugated position with the condenser lens $4_1$ of the virtual regions $8_a$. The re-imaging lens $6_1$ is disposed near the opening $5_1$. The re-imaging lens $6_1$ substantially projects the image of the field opening $3_1$ on the photoelectric conversion surface $7_{a1}$ through the condenser lens $4_1$ and the opening $5_1$ of the pupil division diaphragm 5.

Moreover, the opening $5_2$ of the pupil division diaphragm 5 is disposed at a conjugated position with the condenser lens $4_1$ of the virtual region $8_b$. The re-imaging lens $6_2$ is disposed near the opening $5_2$. The re-imaging lens $6_2$ substantially projects the image of the field opening $3_1$ on the photoelectric conversion surface $7_{b1}$ through the condenser lens $4_1$ and the opening $5_2$ of the pupil division diaphragm 5.

The condenser lens $4_2$ is disposed near the field opening $3_2$. The light beams from the virtual regions $8_a$ and $8_b$ pass through the field opening $3_2$ and the condenser lens $4_2$. The opening $5_2$ of the pupil division diaphragm 5 is disposed at a conjugated position with the condenser lens $4_2$ of the virtual region $8_a$. The re-imaging lens $6_2$ is disposed near the opening $5_2$. The re-imaging lens $6_2$ substantially projects the image of the field opening $3_2$ on the photoelectric conversion surface $7_{a2}$ through the condenser lens $4_2$ and the opening $5_2$ of the pupil division diaphragm 5.

Moreover, the opening $5_3$ of the pupil division diaphragm 5 is disposed at a conjugated position with the condenser lens $4_2$ of the virtual region $8_b$. The re-imaging lens $6_3$ is disposed near the opening $5_3$. The re-imaging lens $6_3$ substantially projects the image of the field opening $3_2$ on the photoelectric conversion surface $7_{b2}$ through the condenser lens $4_2$ and the opening $5_3$ of the pupil division diaphragm 5.

The condenser lens $4_3$ is disposed near the field opening $3_3$. The light beams from the virtual regions $8_a$ and $8_b$ pass through the field opening $3_3$ and the condenser lens $4_3$. The opening $5_3$ of the pupil division diaphragm 5 is disposed at a conjugated position with the condenser lens $4_3$ of the virtual region $8_a$. The re-imaging lens $6_3$ is disposed near the opening $5_3$. The re-imaging lens $6_3$ substantially projects the image of the field opening $3_3$ on the photoelectric conversion surface $7_{a3}$ through the condenser lens $4_3$ and the opening $5_3$ of the pupil division diaphragm 5.

Moreover, the opening $5_4$ of the pupil division diaphragm 5 is disposed at a conjugated position with the condenser lens $4_3$ of the virtual regions $8_b$. The re-imaging lens $6_4$ is disposed near the opening $5_4$. The re-imaging lens $6_4$ substantially projects the image of the field opening $3_3$ on the photoelectric conversion surface $7_4$ through the condenser lens $4_3$ and the opening $5_4$ of the pupil division diaphragm.

Each of the photoelectric conversion surfaces 7 is formed by light receiving members such as CCD or CMOS. The signals of intensity distribution obtained from each of the photoelectric conversion surfaces 7 are led to a signal processing section S. The signal processing section S detects a phase difference on the intensity distribution as to each of the light beams that pass through the optical paths determined by the combinations of the virtual regions $8_a$ and $8_b$ and the field openings $3_1$, $3_2$, and $3_3$ (each of the focus detection areas). Then, based on the detected phase difference, the signal processing section S calculates a distance that the picture-taking lens 1 is moved to be in focus, and instructs a driving means to move the picture-taking lens 1.

According to the present embodiment, the image pickup device can detect a focus in various ways. For example, when only the field opening $3_2$ is used, spot-type focus detection can be performed. In this case, a phase difference of intensity distribution of light received by the photoelectric conversion surfaces $7_{a2}$ and $7_{b2}$ is detected. The distance that the picture-taking lens 1 is moved is determined based on the magnitude of the phase difference. In the example here, the phase difference of intensity distribution of light received by the photoelectric conversion surfaces $7_{a2}$ and $7_{b2}$ is zero, the image pickup device is in in-focus state, which is a state illustrated in FIG. 2A.

On the other hand, when the image of the object obtained through the field opening $3_2$ deviates toward the picture-taking lens 1, there is a downward phase difference in the phase at the photoelectric conversion surface $7_{a2}$ (The position of center of gravity of the image formed by the photoelectric conversion surface $7_{a2}$ deviates from the center of the photoelectric conversion surface $7_{a2}$ toward the photoelectric conversion surface $7_{b2}$). When the image of the object is out of focus and deviates in the opposite direction from the picture-taking lens 1, there is a upward phase difference in the phase at the photoelectric conversion surface $7_{a2}$. The same holds for the other focus detection areas 3.

It is also possible to detect a focus by using a plurality of the field openings. When the three field openings $3_1$, $3_2$, and $3_3$ are for example used, the number of the focus detection areas is three. When the detecting of focus is performed with the use of a plurality of focus detection areas as described above, the intensity distributions of the focus detection areas (the field openings $3_1$, $3_2$, and $3_3$) are detected based on the intensity distributions of the photoelectric conversion surfaces $7_{b1}$, $7_{b2}$, and $7_{b3}$. Based on the magnitude of the phase difference between the detected intensity distributions, the distance that the picture-taking lens 1 is moved is determined. The detecting of focus may be performed after two focus detection areas 3 are arbitrarily selected.

As illustrated in FIGS. 2A and 2B, the opening $5_2$ of the pupil division diaphragm 5 and the re-imaging lens $6_2$ mutually correspond to the field openings $3_1$ and $3_2$ (The light beams that pass through the field openings $3_1$ and $3_2$ pass through the opening $5_2$ of the pupil division diaphragm 5 and the re-imaging lens $6_2$, respectively). However, a different virtual region corresponds to each of the field openings: The field opening $3_1$ corresponds to the virtual region $8_b$ and the field opening $3_2$ to the virtual region $8_a$. Similarly, the opening $5_3$ of the pupil division diaphragm 5 and the re-imaging lens $6_3$ mutually correspond to the field openings $3_2$ and $3_3$.

Figure 18:
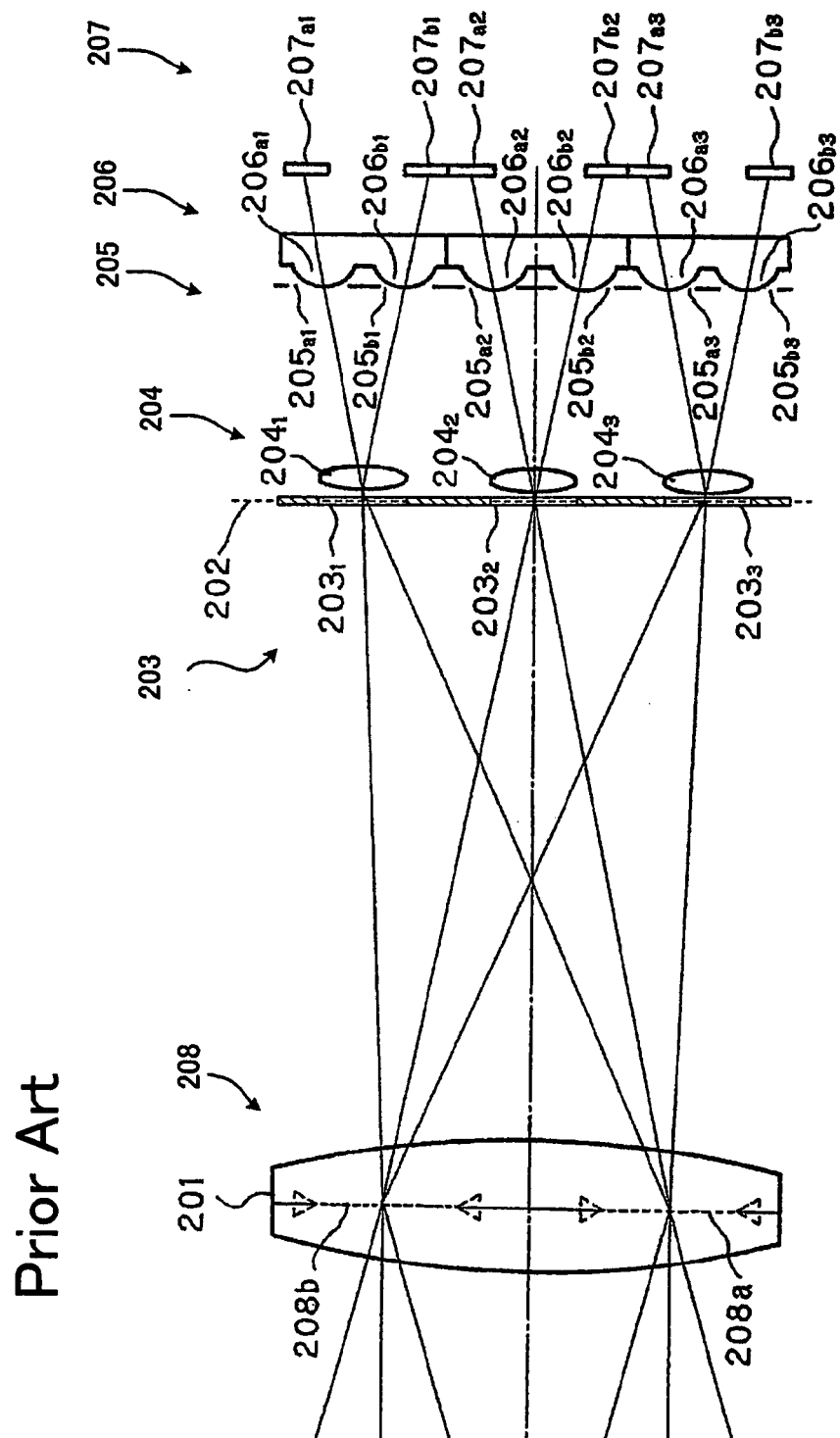
FIG. 18 is a diagram illustrating another conventional focus detection system.

According to the configuration illustrated in FIGS. 2A and 2B, the number of the field openings is three, the same as in a comparative example (FIG. 18). However, according to the configuration illustrated in FIGS. 2A and 2B, there are four re-imaging lenses, whereas there are six re-imaging lenses in the comparative example.

In that manner, according to the configuration illustrated in FIGS. 2A and 2B, the overlapping of optical beams from the field openings to the re-imaging lenses need not be considered. Therefore, as for the arrangement of the field openings, discreteness (a rate of how much the field openings are separated from each other) is made smaller significantly. Moreover, since the incident angle for the re-imaging lens group 6 is also made smaller, the configuration carries advantages in terms of aberration, and it is easier to make the system thinner relative to the spread of the field of view. Furthermore, the photoelectric conversion surfaces 7 can be arranged on the same plane. Therefore, it is easier to reduce the costs of materials and assembly. Moreover, since the discreteness can be made smaller, the outputs of $7_{a1}$, $7_{a2}$, and $7_{a3}$ and the outputs of $7_{b1}$ and $7_{b2}$ and $7_{b3}$ can be easily handled as successive outputs, offering advantages in terms of expanding the distance measurement area and increasing the amount of distance measurable defocusing.

Figure 3:
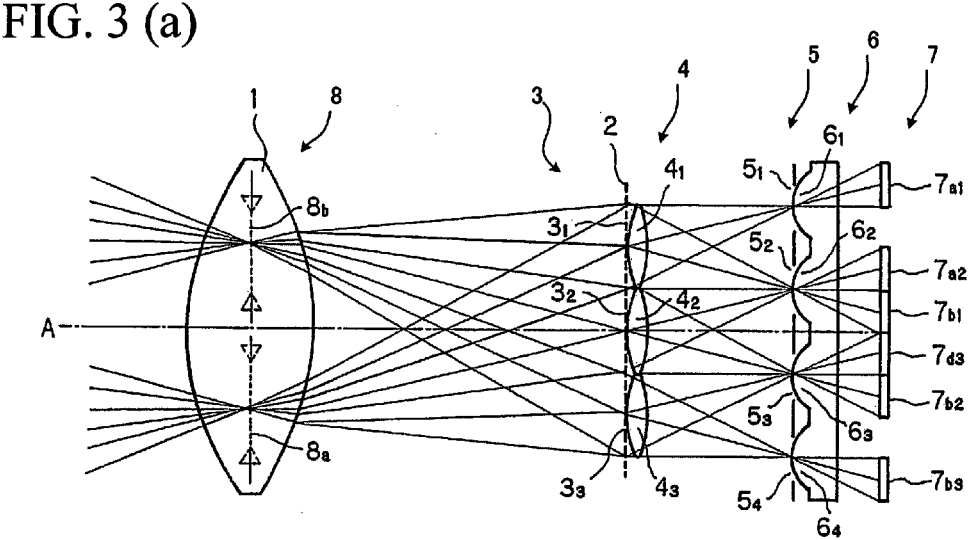
FIGS. 3A and 3B are diagrams illustrating a comparison between the first embodiment and a conventional case.
Figure 3:
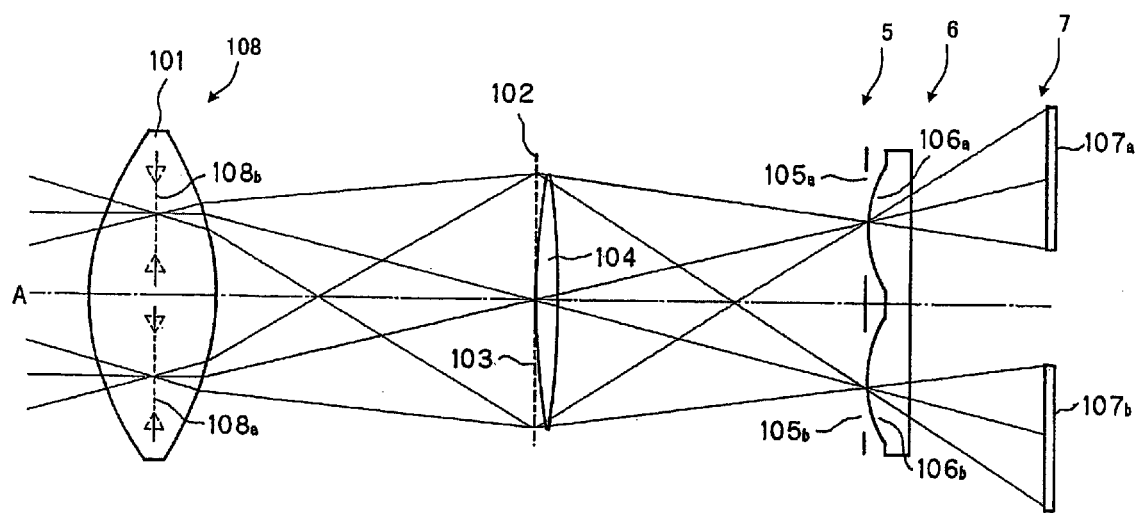

FIGS. 3A and 3B show a comparison between the focus detection system of the present embodiment and the conventional focus detection system. FIG. 3A illustrates one type of focus detection system according to the present embodiment, which is also illustrated in FIGS. 2A and 2B.

According to the present embodiment, since the powers of the condenser lens 4 and the re-imaging lens group 6 can be more naturally increased compared with the conventional focus detection system, the focus detection system can be made thinner.

Figure 4:
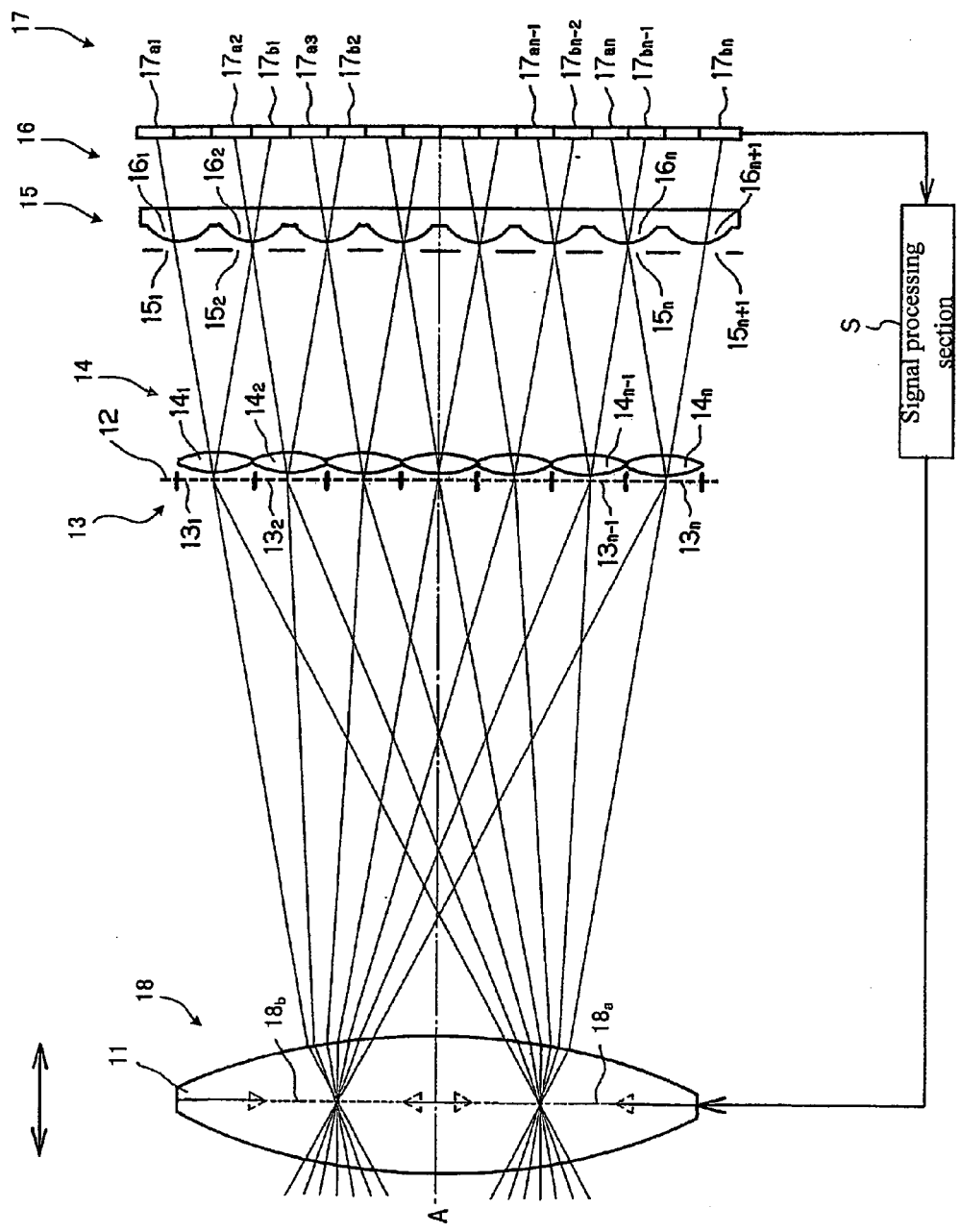
FIG. 4 is a diagram illustrating an embodiment of the present invention in which a field of view is expanded in the first embodiment.

FIG. 4 illustrates an embodiment of the present invention in which compared with the focus detection systems of the above noted embodiments, the number of field openings arranged in a specific direction is increased, and the field of view is extended. According to the embodiment illustrated in FIGS. 2A and 2B, there are three field openings in one direction. However, according to the present embodiment, there are four or more field openings that are arranged in a line.

FIG. 4 illustrates virtual regions 18a and 18b on a picture-taking lens 11 and a field diaphragm surface 12. A field diaphragm 13 is disposed near the field diaphragm surface 12. The openings $13_1$, $13_2$, $13_3$, ... $13_{n-1}$, and $13_n$ of the n field diaphragms 13 are arranged in a line. The openings are field openings forming focus detection areas. The direction in which the field openings are arranged is the same as the direction in which the virtual regions 18a and 18b are arranged. The field openings are the same in size and are arranged side by side at regular intervals, allowing the focus detection system to be formed in an orderly manner and offering advantages in terms of reducing costs. Therefore, the above configuration is preferable.

The condenser lenses $14_1$, $14_2$, $14_3$, ... $14_{n-1}$, and $14_n$ are disposed at positions that are close to the field openings $13_1$, $13_2$, $13_3$, ... $13_{n-1}$, and $13_n$ but are away from the field openings $13_1$, $13_2$, $13_3$, ... $13_{n-1}$, and $13_n$ in the direction of the optical axis. The condenser lenses each correspond to the field openings, and the optical axes of the condenser lenses are different from each other.

At a position that is a predetermined distance away from the field diaphragm surface 12 in the opposite direction from the picture-taking lens 11, a pupil division diaphragm 15 is disposed. On the surface of the pupil division diaphragm 15 which is perpendicular to the optical axis, the openings $15_1$, $15_2$, $15_3$, ... $15_{n-1}$, $15_n$, and $15_{n+1}$ of the (n+1) pupil division diaphragms 15 are disposed. The openings are the same in size and shape and are arranged at regular intervals.

Moreover, when seen through in the direction of the optical axis, it is desirable that the field openings $13_i$ exist between the opening $15_i$ of the pupil division diaphragm 15 and the opening $15_{i+1}$ of the pupil division diaphragm 15. Here, i is in the range of 1 to n. Accordingly, the incident angle of the optical beam for the opening of each pupil division diaphragm 15 is easily made smaller, offering advantages in terms of downsizing and reducing aberration.

The condenser lenses $14_i$, except the condenser lenses $14_1$ and $14_n$, are so formed as to keep conjugated relations between the virtual region 18a and the opening $15_i$ of the pupil division diaphragm 15 and between the virtual region 18b and the opening of the pupil division diaphragms 15. The condenser lens $14_3$ is so formed as to keep a conjugated relation between the virtual region 18a and the opening $15_1$ of the pupil division diaphragm 15. The condenser lens $14_i$ is so formed as to keep a conjugated relation between the virtual region 18b and the opening $15_{n+1}$ of the pupil division diaphragm 15.

In order to realize the above configuration, it is desirable that the condenser lenses be equal in power to each other and that the positional correlation of the center of each opening corresponding to the optical axis of each condenser lens be slightly different from those of the others.

A re-imaging lens group 16 is disposed near the opening $15_i$ (i is in the range of 1 to n+1) of each pupil division diaphragm 15. The re-imaging lens group 16 is positioned a certain distance away from where the pupil division diaphragm 15 is located in the direction of the optical axis. The re-imaging lens group 16 includes a plurality of re-imaging lenses $16_i$.

A substantially conjugated surface (a virtual surface) with the surface of each field opening 13 is formed by the re-imaging lens group 16. On the conjugated surface, a secondary imaging plane is assumed to be present, and light receiving element rows, which are a photoelectric conversion surface 17 of a light receiving member 17A, are arranged.

The re-imaging lens $16_i$ (i is in the range of 1 to n) projects an image formed on the field opening $13_i$ on the photoelectric conversion surface $17_{ai}$ of the light receiving member (on the secondary imaging plane) through the condenser lens $14_i$ and the opening $15_i$ of the pupil division diaphragm 15. The re-imaging lens $16_i$ (i is in the range of 2 to n+1) projects an image formed on the field opening $13_{i-1}$ on the photoelectric conversion surface $17_{bi}$ (on the secondary imaging plane) through the condenser lens $14_{i-1}$ and the opening $15_i$ of the pupil division diaphragm 15.

On the secondary imaging plane, the photoelectric conversion surface 17 is disposed. On the photoelectric conversion surface 17, the photoelectric conversion surfaces $17_{a1}$, $17_{a2}$, $17_{b1}$, $17_{a3}$, $17_{b2}$, ... $17_{ai}$, $17_{b(i-1)}$, $17_{a(i+1)}$, $17_{bi}$, $17_{a(i+2)}$, $17_{b(i+1)}$, ... $17_{an}$, $17_{b(n-1)}$, and $17_{bn}$ are arranged. The photoelectric conversion surfaces are the same in length and are arranged at regular intervals except between $17_{a1}$ and $17_{a2}$ and between $17_{b(n-1)}$ and $17_{bn}$. The photoelectric conversion surfaces 17 here represent an effective area obtaining phase difference information, and may be formed as one unit in an actual production process.

According to the image pickup device of the present embodiment, the focus detection system can be made thinner, and the field of view for distance measurement can be expanded. In order to decrease the distance between the condenser lens 14 and the pupil division diaphragm 15, the power of the condenser lens 14 needs to be increased. According to the present embodiment, the diameter of the condenser lens 14 can be made smaller because every field opening can be made smaller in size. As a result, it is easy to increase the power of the condenser lens 14. Similarly, the power of the re-imaging lens group 16 can be increased.

Moreover, the field openings can be so formed as to be closer to each other. Therefore, the discreteness of the field openings in the entire field of view can be made smaller. Accordingly, even if every field opening is made smaller in size, a plurality of field openings can be collectively handled as one field opening. In this manner, the detecting of focus is performed. Therefore, the detecting of focus is performed with the focus detection system having a large field opening as a whole. In this case, the amount of focus detectable defocusing increases.

Such condenser lenses and rows of re-imaging lens group are so arranged as to be closer to each other and in parallel to each other. Therefore, two-dimensional image information can be obtained.

Figure 5:
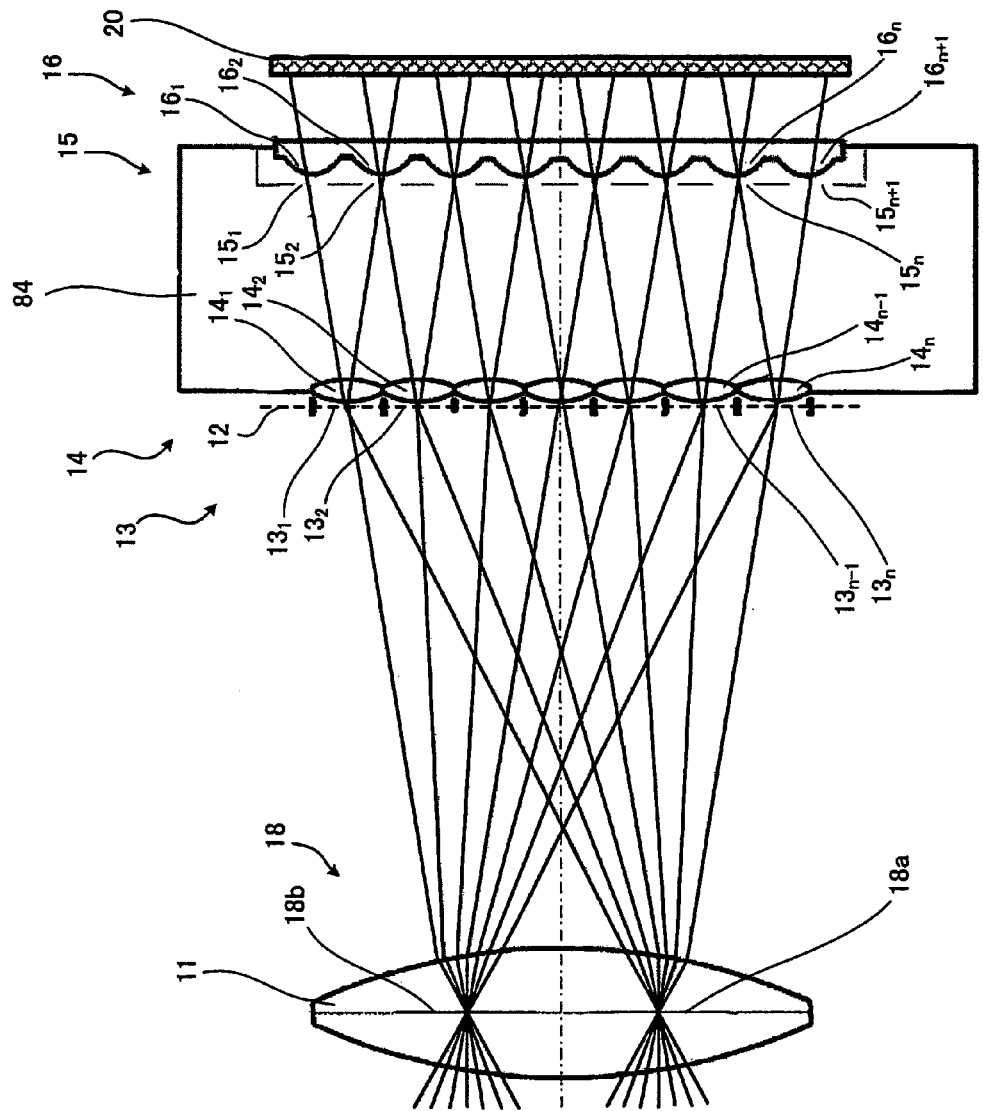
FIG. 5 is a diagram illustrating a focus detection filter section that can be inserted into or ejected from an optical path.

FIG. 5 illustrates a configuration by which a focus detection system, as a focus detection filter section, can be inserted into or ejected from an optical path. Condenser lenses and rows of re-imaging lens group are so arranged as to be closer to each other and in parallel to each other. Therefore, two-dimensional image information can be obtained at the time of insertion. The image information may be displayed as finder information. Therefore, even if an optical finder is not disposed, the detecting of focus can be performed while the object is being observed.

Incidentally, according to the present embodiment, in order to prevent crosstalk and the like, field frames are disposed between the field openings 13.

Figure 6:
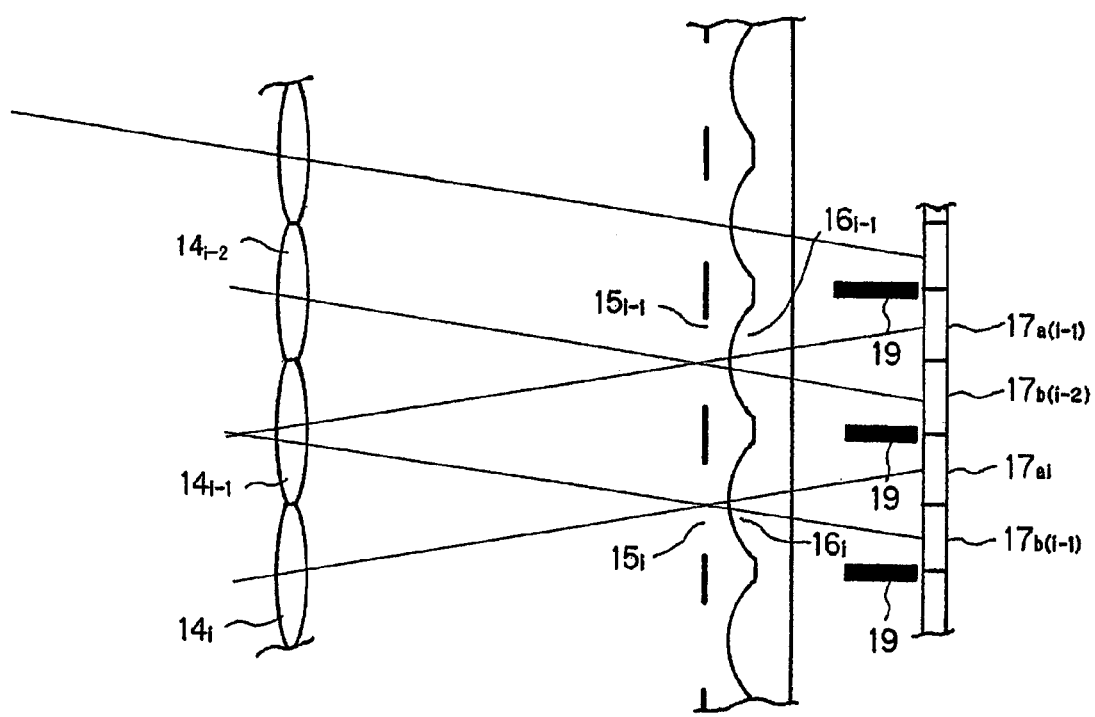
FIG. 6 is a diagram illustrating an embodiment of the present invention in which light shielding walls are disposed.

In addition to, or instead of, the field frame, light shielding walls 19 may be disposed between the re-imaging lens group 16 and the photoelectric conversion surfaces 17 as shown in FIG. 6. In particular, the light shielding walls 19 are effective when the light shielding walls 19 are so disposed as to separate the photoelectric conversion surfaces $17_{b(i-2)}$ and $17_{ai}$. That is, the light shielding walls 19 are provided between the images formed by the lenses of the re-imaging lens group 16. Therefore, the amount of light of the effective light beam at each lens of the re-imaging lens group 16 is secured, and the light beam from the adjacent lens can be blocked. It is desirable that the light shielding walls 19 be part of the focus detection filter section so that the light shielding walls 19 can be inserted into and ejected from the optical path.

Figure 7:
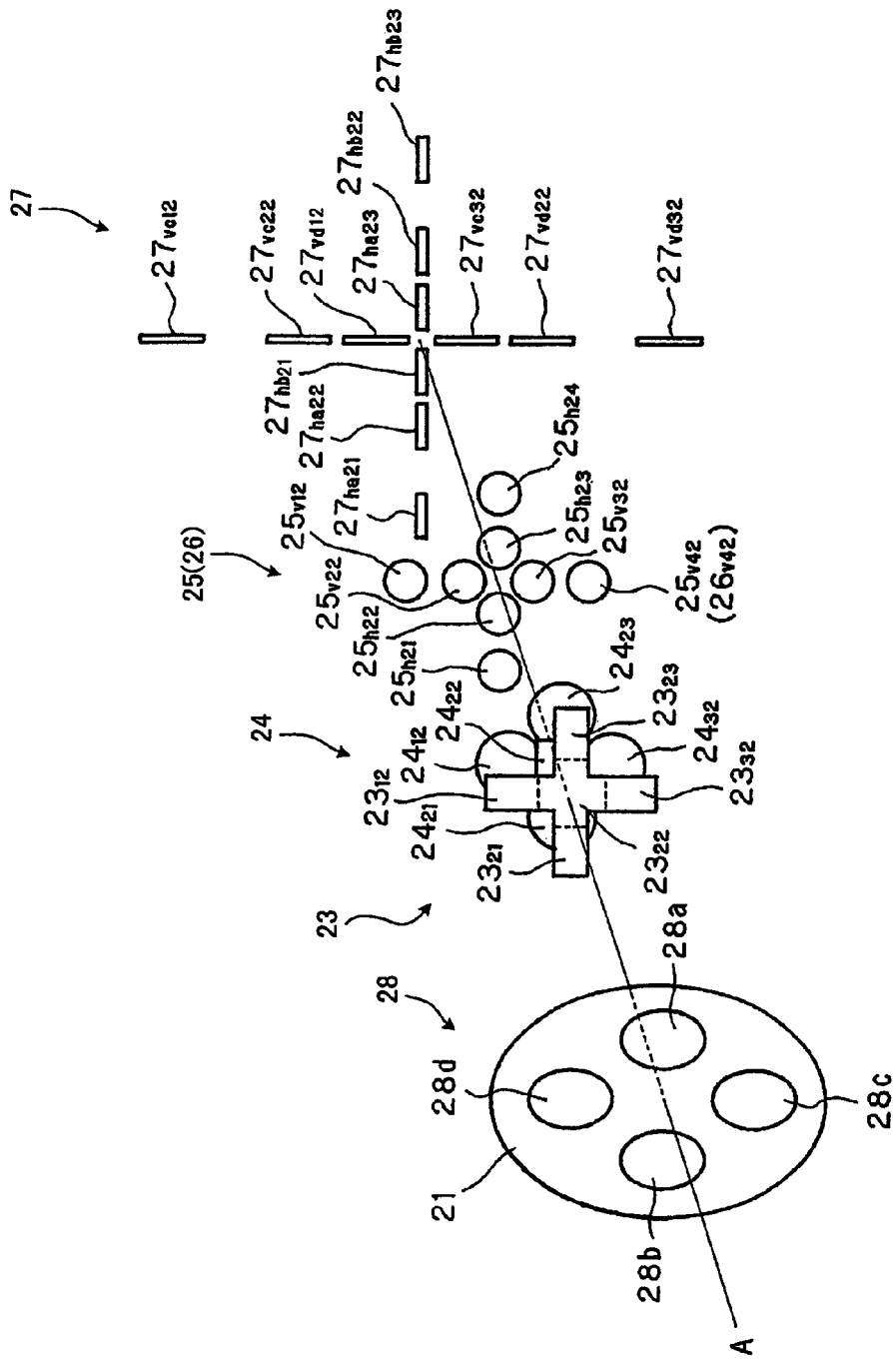
FIG. 7 is a diagram illustrating an embodiment of the present invention in which a distance measurement area is expanded in two directions and in a crisscross manner for focus detection of the embodiment illustrated in FIGS. 2A and 2B.

FIG. 7 illustrates the focus detection system of the embodiment illustrated in FIGS. 2A and 2B, with the distance measurement area being expanded in two directions and in a crisscross manner. Therefore, the phase difference information for detecting a focus can be used in two directions.

In FIG. 7, on a picture-taking lens 21, two pairs of virtual regions (a pair of 28a and 28b and a pair of 28c and 28d) are assumed to be present. There are a pair of virtual regions 28a and 28b and a pair of virtual regions 28c and 28d.

The virtual regions in one pair are arranged in a different direction from the virtual regions in the other pair (28a and 28b are arranged in the horizontal direction; 28c and 28d are arranged in the vertical direction). An aperture diaphragm 23 is disposed near a field diaphragm surface 22 (not shown) that is equivalent to an image pickup plane. The aperture diaphragm 23 includes field openings $23_{21}$, $23_{22}$, $23_{23}$, $23_{12}$, and $23_{32}$. The field openings are the openings of the field diaphragm 23 forming five focus detection areas. The field openings each correspond to the focus detection areas. Incidentally, at the central field opening $23_{22}$, the vertical-direction focus detection area and the horizontal-direction focus detection area cross each other.

With the field opening $23_{22}$ positioned at the center, the field openings $23_{21}$, $23_{22}$, and $23_{23}$ are arranged in that order in a straight line (in this case, in the horizontal direction). With the field opening $23_{22}$ positioned at the center, the field openings $23_{12}$, $23_{22}$, and $23_{32}$ are arranged in a straight line (in a direction perpendicular to the direction in which the field openings $23_{21}$, $23_{22}$, and $23_{23}$ are arranged).

With the optical axis of the picture-taking lens 21 positioned at the center, the direction in which the virtual regions 28a and 28b are arranged is the same direction as the direction in which the field openings $23_{21}$, $23_{22}$, and $23_{23}$ are arranged. With the optical axis of the picture-taking lens 21 positioned at the center, the direction in which the virtual regions 28c and 28d are arranged is the same direction as the direction in which the field openings $23_{12}$, $23_{22}$, and $23_{32}$ are arranged.

A condenser lens $24_{21}$ is disposed near the field opening $23_{21}$. Similarly, condenser lenses $24_{22}$, $24_{23}$, $24_{12}$, and $24_{32}$ are arranged near the field openings $23_{22}$, $23_{23}$, $23_{12}$, and $23_{32}$, respectively. The optical axes of the condenser lenses are different from each other.

At a conjugated position with the condenser lens $24_{22}$ of the virtual region 28a, the opening $25_{h22}$ of a pupil division diaphragm 25 is disposed. Similarly, at conjugated positions with the condenser lens $24_{22}$ of the virtual regions 28b, 28c, and 28d, the openings $25_{h23}$, $25_{v22}$, and $25_{v32}$ of the pupil division diaphragm 25 are so disposed as to correspond to the virtual regions. Furthermore, at conjugated positions with the condenser lens $24_{21}$ of the virtual regions 28a and 28b, the openings $25_{h21}$ (corresponding to the virtual region 28a) and $25_{h22}$ (corresponding to the virtual region 28b) of the pupil division diaphragm 25 are disposed.

As for the correlations of the other condenser lenses $24_{23}$, $24_{12}$, and $24_{32}$, it appears as if the correlation of the above condenser lens $24_{21}$ is rotated around the optical axis of the picture-taking lens 21.

That is, at conjugated positions with the condenser lens $24_{23}$ of the virtual regions 28a and 28b, the openings $25_{h23}$ and $25_{h24}$ of the pupil division diaphragm 25 are disposed. At conjugated positions with the condenser lens $24_{12}$ of the virtual regions 28c and 28d, the openings $25_{v12}$ and $25_{v22}$ of the pupil division diaphragm 25 are disposed. At conjugated positions with the condenser lens $24_{32}$ of the virtual regions 28c and 28d, the openings $25_{v32}$ and $25_{v42}$ of the pupil division diaphragm 25 are disposed.

Re-imaging lenses $26_{h21}$, $26_{h22}$, $26_{h23}$, $26_{h24}$, $26_{v12}$, $26_{v22}$, $26_{v32}$, and $26_{v42}$ are disposed near the openings $25_{h21}$, $25_{h22}$, $25_{h23}$, $25_{h24}$, $25_{v12}$, $25_{v22}$, $25_{v32}$, and $25_{v42}$ of the pupil division diaphragms, respectively. For ease of explanation, a re-imaging lens group 26 is not shown in FIG. 5. However, it is considered that the re-imaging lens group 26 is disposed as one unit with the pupil division diaphragms 25.

The function of the horizontal-direction re-imaging lenses will be described.

The re-imaging lens $26_{h21}$ projects an image formed on the field opening $23_{21}$ on the photoelectric conversion surface $27_{ha21}$ through the condenser lens $24_{21}$ and the opening $25_{h21}$ of the pupil division diaphragm 25.

The re-imaging lens $26_{h22}$ projects an image formed on the field opening $23_{21}$ on the photoelectric conversion surface $27_{hb21}$ through the condenser lens $24_{21}$ and the opening $25_{h22}$ of the pupil division diaphragm 25, and an image formed on the field opening $23_{22}$ on the photoelectric conversion surface $27_{h22}$ through the condenser lens $24_{22}$ and the opening $25_{h22}$ of the pupil division diaphragm 25.

The re-imaging lens $26_{h23}$ projects an image formed on the field opening $23_{22}$ on the photoelectric conversion surface $27_{hb22}$ through the condenser lens $24_{22}$ and the opening $25_{h23}$ of the pupil division diaphragm 25, and an image formed on the field opening $23_{23}$ on the photoelectric conversion surface $27_{ha23}$ through the condenser lens $24_{23}$ and the opening $25_{h23}$ of the pupil division diaphragm 25.

The re-imaging lens $26_{h24}$ projects an image formed on the field opening $23_{23}$ on the photoelectric conversion surface $27_{hb23}$ through the condenser lens $24_{23}$ and the opening $25_{h24}$ of the pupil division diaphragm 25.

The function of the vertical-direction re-imaging lenses will be described.

The re-imaging lens $26_{v12}$ projects an image formed on the field opening $23_{12}$ on the photoelectric conversion surface $27_{vc12}$ through the condenser lens $24_{12}$ and the opening $25_{v12}$ of the pupil division diaphragm 25.

The re-imaging lens $26_{v22}$ projects an image formed on the field opening $23_{12}$ on the photoelectric conversion surface $27_{vd12}$ through the condenser lens $24_{12}$ and the opening $25_{v22}$ of the pupil division diaphragm 25, and an image formed on the field opening $23_{22}$ on the photoelectric conversion surface $27_{vc22}$ through the condenser lens $24_{22}$ and the opening $25_{v22}$ of the pupil division diaphragm 25.

The re-imaging lens $26_{v32}$ projects an image formed on the field opening $23_{22}$ on the photoelectric conversion surface $27_{vd22}$ through the condenser lens $24_{22}$ and the opening $25_{v32}$ of the pupil division diaphragm 25, and an image formed on the field opening $23_{32}$ on the photoelectric conversion surface $27_{vc32}$ through the condenser lens $24_{32}$ and the opening $25_{v32}$ of the pupil division diaphragm 25.

The re-imaging lens $26_{v42}$ projects an image formed on the field opening $23_{32}$ on the photoelectric conversion surface $27_{vd32}$ through the condenser lens $24_{32}$ and the opening $25_{v42}$ of the pupil division diaphragm 25.

Each photoelectric conversion surface of the photoelectric conversion surface 27 is disposed at a substantially conjugated surface with each of the field openings 23.

Figure 8:
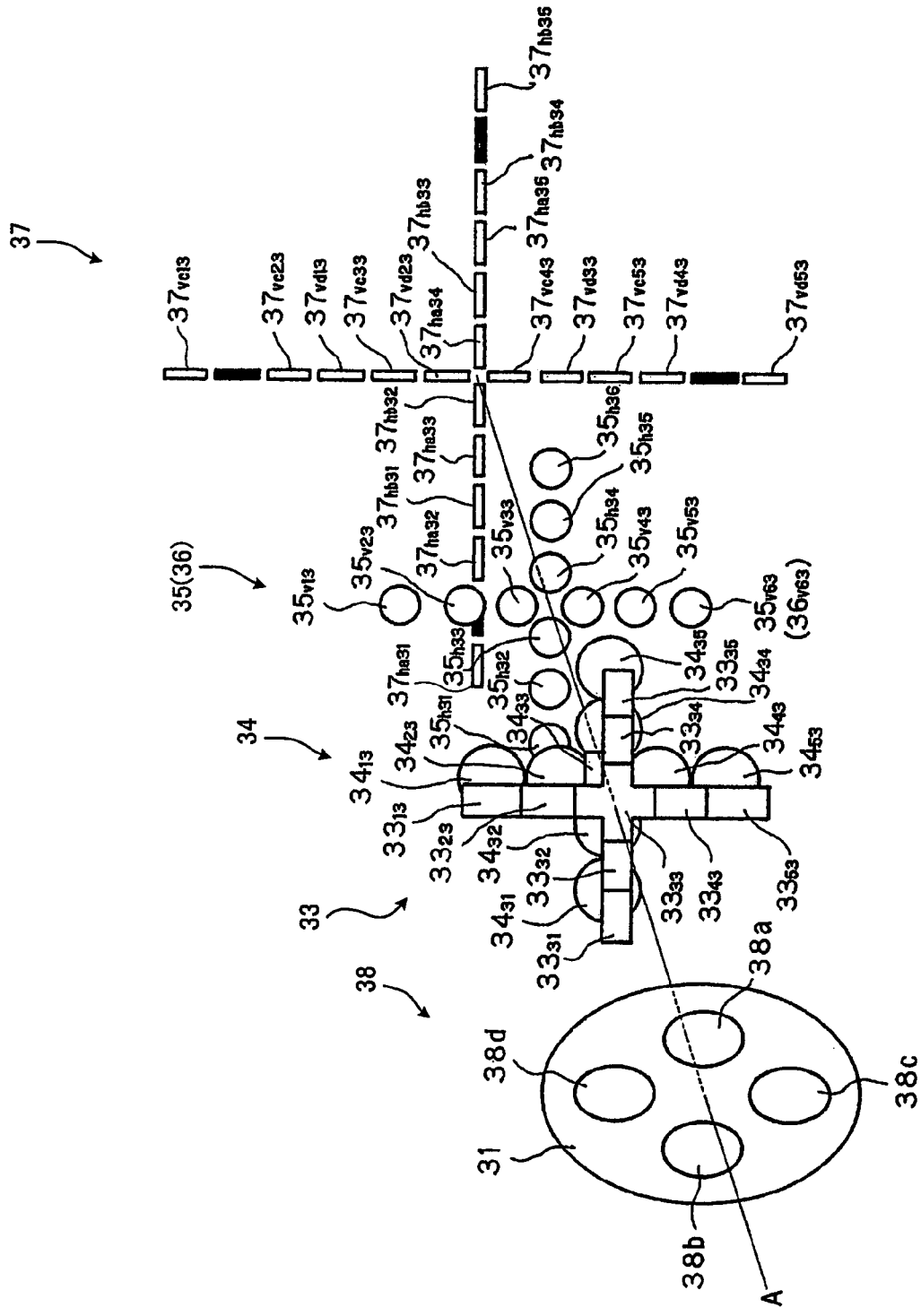
FIG. 8 is a diagram illustrating an embodiment of the present invention in which a field of view is expanded in the embodiment illustrated in FIG. 7.

FIG. 8 illustrates crisscross focus detection areas (the fields of view for focus detection), like those illustrated in FIG. 7, that are extended in the vertical and horizontal directions. The focus detection areas can be expanded in both the vertical and horizontal directions of a screen. FIG. 8 illustrates virtual regions 38a, 38b, 38c, and 38d of a picture-taking lens 31. In the example here, with the optical axis of the picture-taking lens 31 positioned at the center, there are five openings (field openings) of a field diaphragm 33 of the focus detection area arranged in a line in the vertical direction and five arranged in a line in the horizontal direction, and the two lines of openings both have the central field opening $33_{33}$ where the two lines cross each other. As shown in the diagram, the total number of the field openings is nine. The central field opening $33_{33}$ is designed to detect phase differences in the vertical and horizontal directions, leading to an increase in focus detection accuracy.

Condenser lenses 34 each having a different optical axis are so disposed as to correspond to the focus detection areas. Each condenser lens 34 leads a light beam to a pair of adjacent re-imaging lenses. Incidentally, a pair of adjacent re-imaging lenses is one that is so disposed as to correspond to the field opening.

A re-imaging lens group 36 includes 12 re-imaging lenses, six of which are arranged in the vertical direction and the remaining six in the horizontal direction. The re-imaging lenses are so arranged as to be symmetrical about the optical axis of the picture-taking lens 31. Except the outermost four re-imaging lenses, the re-imaging lenses lead the light beams coming from the adjacent two field openings to subsequent light receiving element rows (a photoelectric conversion surface 37).

The correlations of the virtual regions 38a, 38b, 38c, and 38d of the picture-taking lens 31, the aperture diaphragm 33, the condenser lenses 34, a pupil division diaphragm 35, the re-imaging lens group 36, and the photoelectric conversion surface 37 in both the vertical and horizontal directions have been described in FIGS. 3A and 3B.

Figure 9:
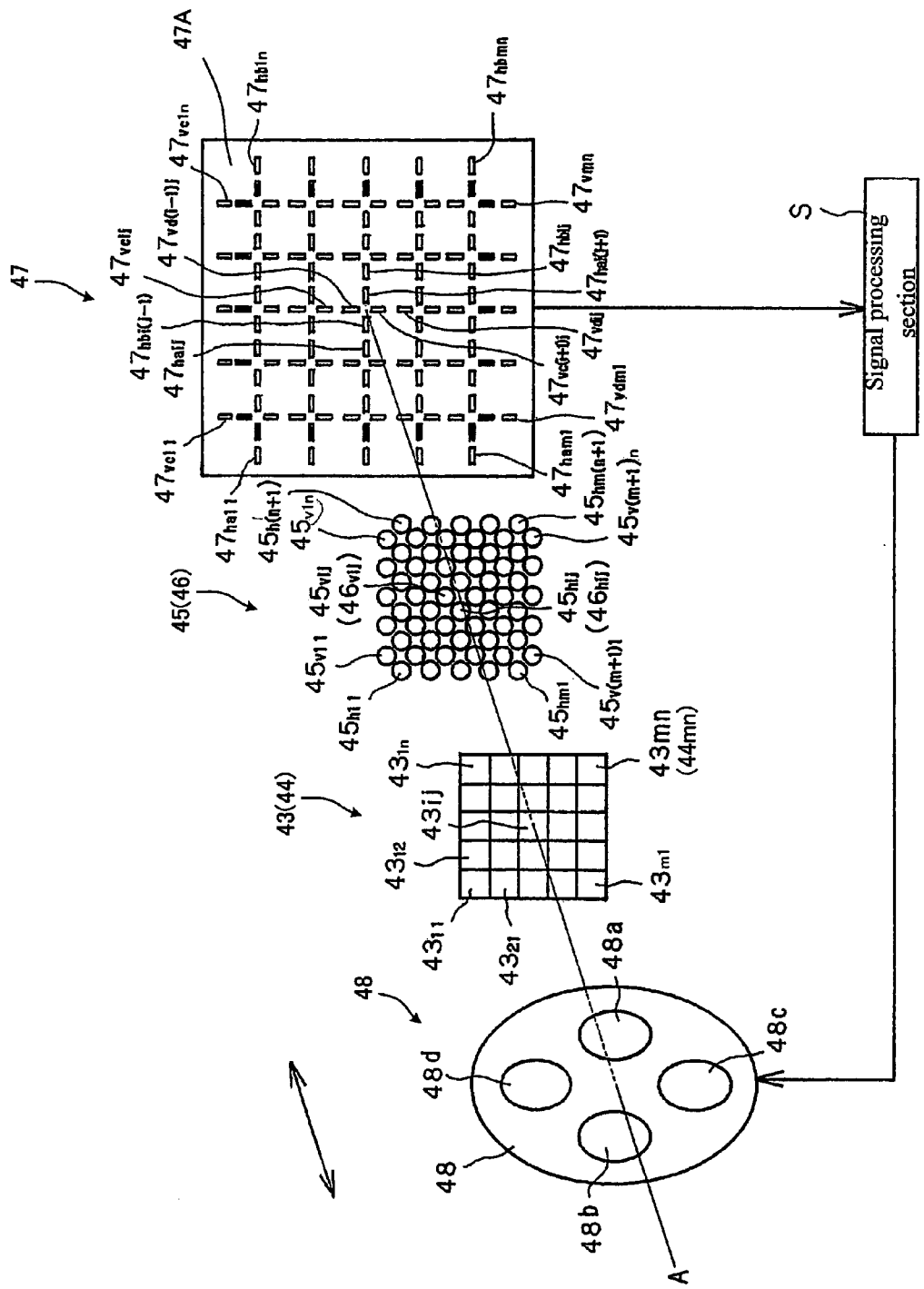
FIG. 9 is a diagram illustrating a third embodiment of the present invention.

FIG. 9 illustrates an embodiment of the present invention in which a plurality of focus detection systems, which are the same as the one illustrated in FIG. 4, are arranged in lines in the vertical and horizontal directions. FIG. 9 schematically illustrates the openings (field openings) of a field diaphragm 43, a re-imaging lens group 46, light receiving element rows (photoelectric conversion surface) 47, and the like. The components, like the crisscross ones illustrated in FIG. 8, have been expanded in a two-dimensional way.

Like the case illustrated in FIG. 8, the reference numerals 48a, 48b, 48c, and 48d denote virtual regions. Field openings $43_{ij}$ ($1 \leq i \leq m$, and $1 \leq j \leq n$) are arranged in the shape of a matrix: the m field openings are arranged in a direction in which the virtual regions 48a and 48b are arranged, and the n field openings are arranged in a direction in which the virtual regions 48c and 48d are arranged. Condenser lenses $44_{ij}$ ($1 \leq i \leq m$, and $1 \leq j \leq n$) that each correspond to the field openings are disposed near the field openings $43_{ij}$ (In the diagram, the condenser lenses are illustrated as one unit with the field openings 43).

Incidentally, as illustrated in FIG. 6, m and n increase by one in order of arrangement.

Each of the field openings supports the detecting of phase difference in the vertical and horizontal directions. The field opening may be a crisscross opening formed by putting a focus detection area extending in the vertical direction on a focus detection area extending in the horizontal direction, or an opening in the shape of a square, rectangle, or the like that covers an amount detection area.

On the conjugated surface of a virtual region surface by each condenser lens, a pupil division diaphragm 45 is disposed. The pupil division diaphragm 45 includes openings $45_{hij}$ ($1 \leq i \leq m+1$, and $1 \leq j \leq n$) and openings $45_{vij}$ ($1 \leq i \leq m$, and $1 \leq j \leq n+1$). The openings $45_{hij}$ are used to obtain the horizontal-direction phase difference information: n lines of m+1 openings arranged in the horizontal direction are arranged in parallel in the vertical direction. On the other hand, the openings $45_{vij}$ are used to obtain the vertical-direction phase difference information: m lines of n+1 openings arranged in the vertical direction are arranged in parallel in the horizontal direction.

According to the above configuration, thanks to the condenser lenses $44_{ij}$, conjugated relations are maintained between the virtual region 48a and the opening $45_{hij}$, between the virtual region 48b and the opening $45_{h(i+1)j}$, between the virtual region 48c and the opening $45_{vij}$, and between the virtual relation 48d and the opening $45_{vi(j+i)}$.

The re-imaging lens group 46 is disposed near the pupil division diaphragm 45 so that the lenses each correspond to the openings of the pupil division diaphragm 45. The re-imaging lens group 46 includes the re-imaging lenses $46_{hij}$ ($1 \leq i \leq m+1$, and $1 \leq j \leq n$) and $46_{hij}$ ($1 \leq i \leq m$, and $1 \leq j \leq n+1$) (In the diagram, the re-imaging lenses are illustrated as one unit with the openings of the pupil division diaphragm 45).

If a substantially conjugated plane with each field opening $43_{ij}$ is assumed to be a secondary imaging plane, the photoelectric conversion surface 47 is disposed on the secondary imaging surface. The photoelectric conversion surface 47 includes photoelectric conversion surfaces $47_{ahij}$ ($1 \leq i \leq m$, and $1 \leq j \leq n$), $47_{bhij}$ ($1 \leq i \leq m$, and $1 \leq j \leq n$), $47_{cvij}$ ($1 \leq i \leq m$, and $1 \leq j \leq n$), and $47_{dvij}$ ($1 \leq i \leq m$, and $1 \leq j \leq n$). Each of the images formed on the field openings $43_{ij}$ is re-imaged by the re-imaging lenses $46_{hij}$ and $46_{vij}$ on each photoelectric conversion surface.

The photoelectric conversion surfaces $47_{ahij}$ ($1 \leq i \leq m$, and $1 \leq j \leq n$) and $47_{bhij}$ ($1 \leq i \leq m$, and $1 \leq j \leq n$) that detect phase differences in the horizontal direction, except those at both ends, are alternately arranged in the same row as shown in FIGS. 3A and 3B. The photoelectric conversion surfaces $47_{cvij}$ ($1 \leq i \leq m$, and $1 \leq j \leq n$) and $47_{dvij}$ ($1 \leq i \leq m$, and $1 \leq j \leq n$) that detect phase differences in the horizontal direction, except those at both ends, are alternately arranged in the same row as shown in FIGS. 3A and 3B.

The light beam that passes through the virtual region 48a is led to the photoelectric conversion surface $47_{ahij}$ through the field opening $43_{ij}$, the condenser lens $44_{ij}$, the opening $45_{hij}$ of the pupil division diaphragm 45, and the re-imaging lens $46_{hij}$. Then, the image around the field opening $43_{ij}$ is re-imaged on the photoelectric conversion surface $47_{ahij}$.

The light beam that passes through the virtual region 48b is led to the photoelectric conversion surface $47_{bhij}$ through the field opening $43_{ij}$, the condenser lens $44_{ij}$, the opening $45_{h(i+1)}$ of the pupil division diaphragm 45, and the re-imaging lens $46_{h(j+1)}$. Then, the image around the field opening $43_{ij}$ is re-imaged on the photoelectric conversion surface $47_{bhij}$.

Similarly, the light beam that passes through the virtual region 48c is led to the photoelectric conversion surface $47_{cvij}$ through the field opening $43_{ij}$, the condenser lens $44_{ij}$, the opening $45_{vij}$ of the pupil division diaphragm 45, and the re-imaging lens $46_{vij}$. Then, the image around the field opening $43_{ij}$ is re-imaged on the photoelectric conversion surface $47_{cvij}$.

The light beam that passes through the virtual region 48d is led to the photoelectric conversion surface $47_{dvij}$ through the field opening $43_{ij}$, the condenser lens $44_{ij}$, the opening $45_{v(i+1)j}$ of the pupil division diaphragm 45, and the re-imaging lens $46_{v(i+1)j}$. Then, the image around the field opening $43_{ij}$ is re-imaged on the photoelectric conversion surface $47_{dvij}$.

In that manner, the focus detection filter section of the present embodiment obtains the two-direction phase difference information for a large distance measurement area and is formed by a thin focus detection system. Moreover, the field opening is fractionized while discreteness is maintained low. Therefore, the highly accurate focus detection system can be formed. Incidentally, in order to prevent crosstalk and the like, a field frame may be formed on the field opening, and a light shielding wall 49 (not shown) may be disposed between the re-imaging lens and the photoelectric conversion surface.

As described above, the focus detection filter section is so formed as to be able to be inserted into or withdrawn from the picture-taking optical path. When a picture is taken, the focus detection filter section is withdrawn. When a focus is detected, the focus detection filter section is inserted. If the object is observed through the output from the image pickup element, the focus detection filter section may be so formed as to allow observing the object even when the focus detection filter section is inserted or withdrawn. At this time, it is preferable that the number of pixels of the image pickup element is greater than or equal to five million.

If the detecting of focus is performed with the use of one-direction phase difference information such as the one illustrated in FIG. 4, the magnifying power of the re-imaging system of the present application is preferably less than or equal to ½. If the detecting of focus is performed with the use of two-direction phase difference information such as those illustrated in FIGS. 7 and 8, the magnifying power of the re-imaging system is preferably less than or equal to ⅓. Such configuration allows the photoelectric conversion surface to be efficiently formed.

Figure 10:
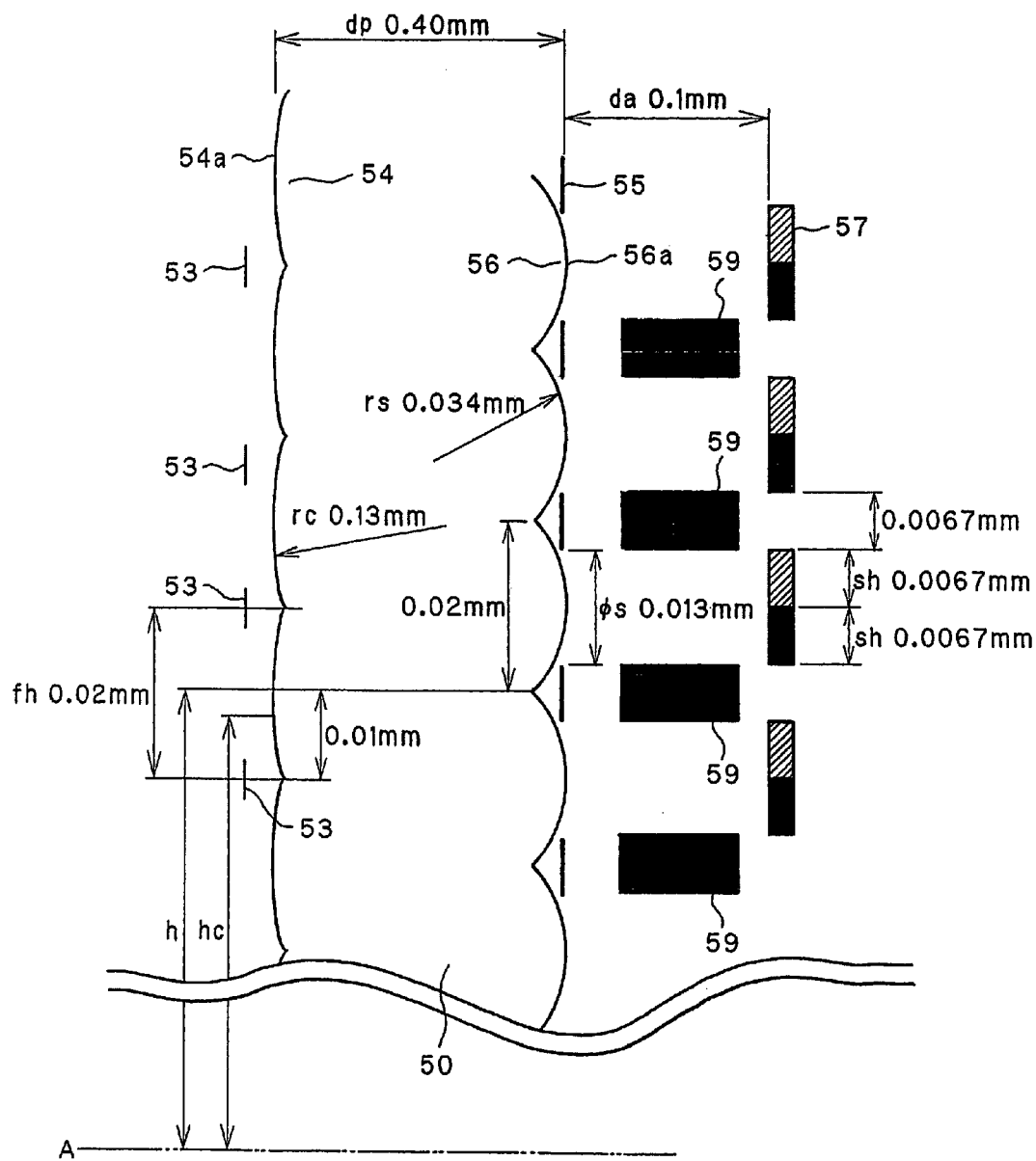
FIG. 10 is a diagram illustrating an example related to numbers.

FIG. 10 illustrates an example related to numbers. In the example described here, there is a two-dimensional expansion like the one illustrated in FIG. 9. In FIG. 10, part of a cross-section surface in one h direction is described. In the number-related example here, the virtual region is assumed to be −100 mm from the field diaphragm surface. Moreover, as for the intervals (pitch) of the center of the opening (field opening) of the field diaphragm 53, the pitch (fh) of the horizontal direction (h direction) is 0.02 mm, and the pitch (fv) of the vertical direction (v direction) is 0.02 mm. The space between condenser lenses 54 and a re-imaging lens group 56 is filled with an optical medium, thereby forming a plate 50.

In other words, on the plate 50's side face facing the picture-taking lens, the condenser lenses 54 (an array 54a) are formed; on the side face facing a photoelectric conversion surface 57, the re-imaging lens group 56 (an array 56a) is formed.

The plate 50 is made of resin. The refractive index of the medium is 1.5. The radius of curvature rc of the condenser lenses (each of the lens surfaces) is 0.13 mm. The radius of curvature r of the re-imaging lens group 56 (each of the lens surfaces) is 0.034 mm. The thickness dp of the plate is 0.4 mm. The openings of the pupil division diaphragm 55 and the re-imaging lenses 56 (the lens surfaces) are formed as one unit in the shape of a circle whose diameter cps is 0.013 mm. The distance da between the re-imaging lenses 56 and the photoelectric conversion surface 57 is 0.1 mm. The focus detection system is so formed as to provide the magnifying power of approximately ⅓.

In the h and v directions, the intervals (pitch) at which the re-imaging lenses are arranged are about 0.02 mm like the condenser lenses 54. In this case, the focal length of the condenser lenses 54 is assumed to be 0.27 mm and the focal point of the re-imaging lenses 0.09 mm. If the distance from the center of the field diaphragm 53 to an optical axis 51 of the picture-taking lens is h, the distance hc from the condenser lens 54 to the optical axis 51 is 0.9973×h. Incidentally, the middle point of the adjacent re-imaging lenses is disposed on a line extending from the center of the field diaphragm 53 toward the optical axis 51. The light receiving range of each photoelectric conversion surface 57 is 0.0067 mm×0.0067 mm in size (sh (horizontal direction)×sv (vertical direction)).

Moreover, it is desirable that a light shielding wall 59 be disposed between the middle point of the adjacent re-imaging lenses 56 and the photoelectric conversion surface 57. Incidentally, if the magnifying power of the focus detection optical system is ⅓, a space through which a formal light beam (a beam used for focus detection) does not pass emerges between the center of the middle point of the adjacent re-imaging lenses 56 and the photoelectric conversion surface 57. In the example here, the light shielding wall 59 is disposed in a 0.0067 mm×0.0067 mm area around the middle point of the adjacent re-imaging lenses 56.

A field frame 53a is disposed at the field opening 53. The light shielding wall 59 and the field frame 53a can efficiently prevent the crosstalk of the photoelectric conversion surface 57 corresponding to one re-imaging lens 56.

Figure 11:
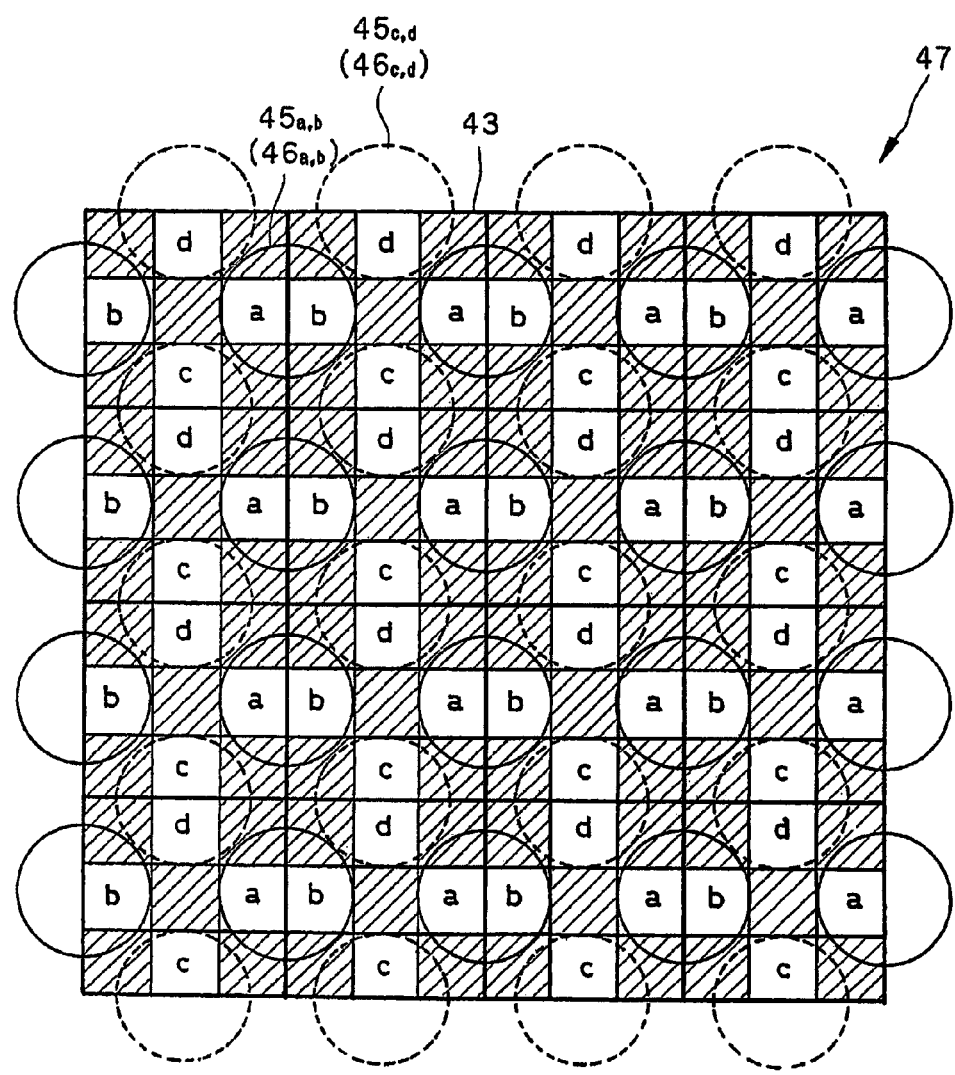
FIG. 11 is a diagram illustrating the layout of photoelectric conversion members as seen in the direction of an optical axis.

FIG. 11 shows the layout of photoelectric conversion members 47 as seen in the direction of an optical axis. The diagram shows part of the expanded layout of the photoelectric conversion sections 47 formed as one unit. On the photoelectric conversion sections 47, light receiving element rows are arranged in a matrix manner in the vertical and horizontal directions.

In the diagram, the square areas marked with diagonal lines represent portions that are not used for focus detection. The square areas marked with a, b, c, and d are the ranges of the photoelectric conversion portions that respectively correspond to the virtual regions 48a, 48b, 48c, and 48d illustrated in FIG. 7.

The square areas encircled by bold lines represent the ranges of the field openings 43 that are projected in the direction of the optical axis. It is clear that the square areas encircled by bold lines are each three times as much as the regions of the photoelectric conversion means 47 in the horizontal and vertical direction.

Circles represent the effective areas of the pupil division diaphragm openings 45 projected in the direction of the optical axis and the effective areas of the re-imaging lenses 46 disposed near the pupil division diaphragm openings 45. The solid-line circles correspond to the pupil division diaphragm openings 45 that detect the horizontal-direction phase information corresponding to the virtual regions 48a and 48b illustrated in FIG. 7; and the re-imaging lenses 47. The dot-line circles correspond to the pupil division diaphragm openings 45 that detect the vertical-direction phase information corresponding to the virtual regions 48c and 48d illustrated in FIG. 7.

Thanks to the above configuration, the focus detection filter section can be formed by one plate, thereby simplifying the structure of insertion and withdrawal with respect to the picture-taking lens optical path. Moreover, according to the number-related example here, if the f-number of the picture-taking lenses is brighter than four when a focus is detected, the aperture is lowered to f4 to reduce the effect of crosstalk while easing a burden on the light shielding walls.

Figure 12:
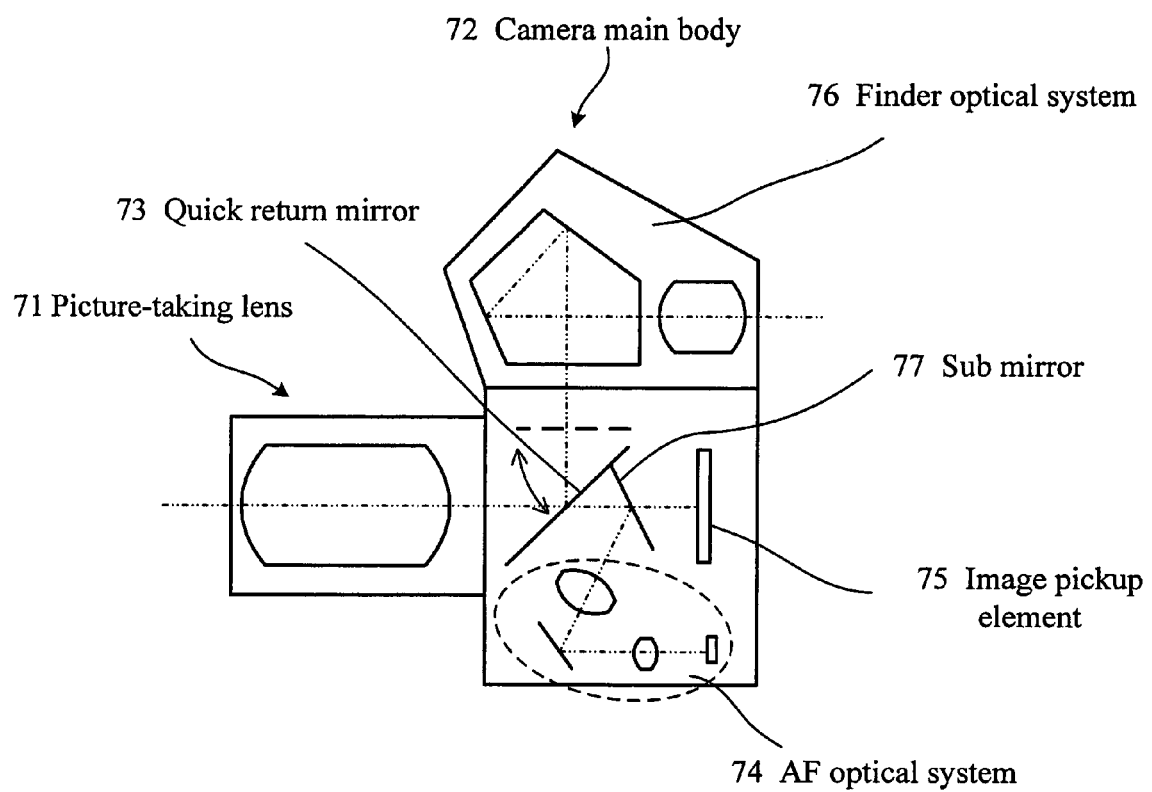
FIG. 12 is a diagram illustrating an example of how components are mounted on an image pickup device.

FIG. 12 illustrates an example of the layout of a conventional camera body. An image pickup device here is equipped with a quick return mirror 73 and a sub mirror 77, which enter an optical path at the time of focus detection and framing and withdraw from the optical path when a picture is taken. The image pickup device also includes a finder optical system 76 formed on a reflection optical path of the quick return mirror 73. A focus detection optical system 74 is disposed on a path of light that is reflected by the sub mirror 77 after passing through the quick return mirror 73. The image pickup plane of an image pickup element 75, such as CCC, CMOS, or the like, is disposed on an optical path that emerges after the quick return mirror 73 and the sub mirror 77 are withdrawn.

FIGS. 13, 14, 15, and 16 show examples of how components are mounted on an actual camera body. In each case, the picture-taking lens may be formed as one unit with the body or be replaceable.

Figure 13:
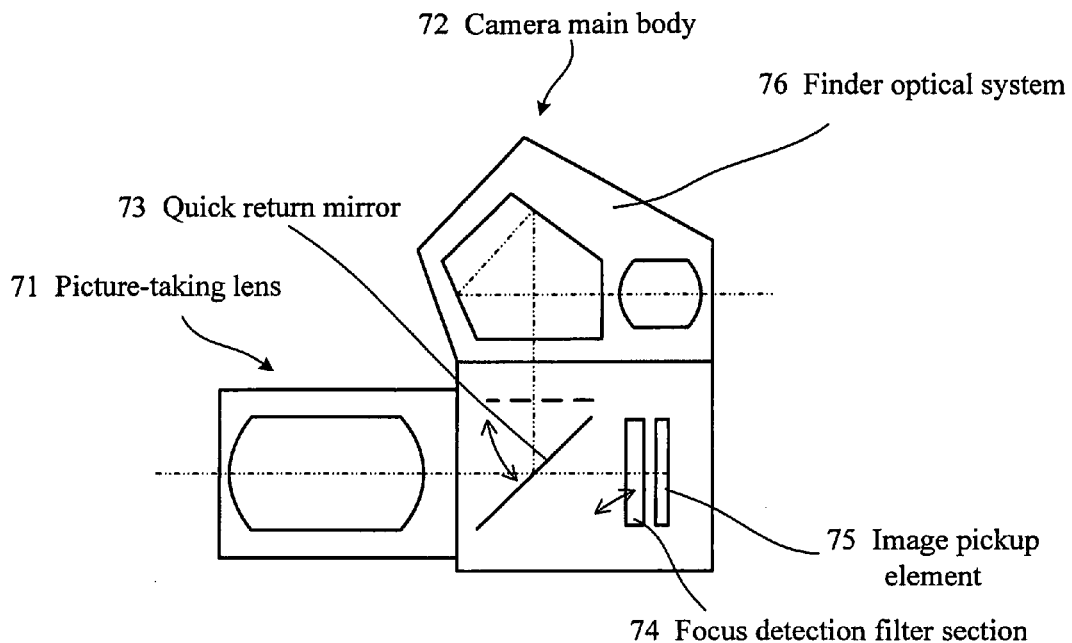
FIG. 13 is a diagram illustrating an example of how components are mounted on an image pickup device.

An image pickup device illustrated in FIG. 13 is equipped with a quick return mirror 73, which enters an optical path at the time of framing and withdraws from the optical path when a picture is taken. The image pickup device also includes a finder optical system 76 formed on a reflection optical path of the quick return mirror 73. Furthermore, the image pickup device includes a focus detection filter section disposed near an image pickup element 75's one side, which is closer to an object than the other side. The focus detection filter section enters an optical path when a focus is detected and withdraws from the optical path when a picture is taken. It is desirable that the focus detection filter slide in a direction perpendicular to the plane of paper when withdrawing from the optical path, because the direction does not make a great impact on the size and shape of the entire body. If the quick return mirror is a half mirror, the quick return mirror can stay in the optical path even when a focus is detected, and framing is possible even when a focus is detected.

Figure 14:
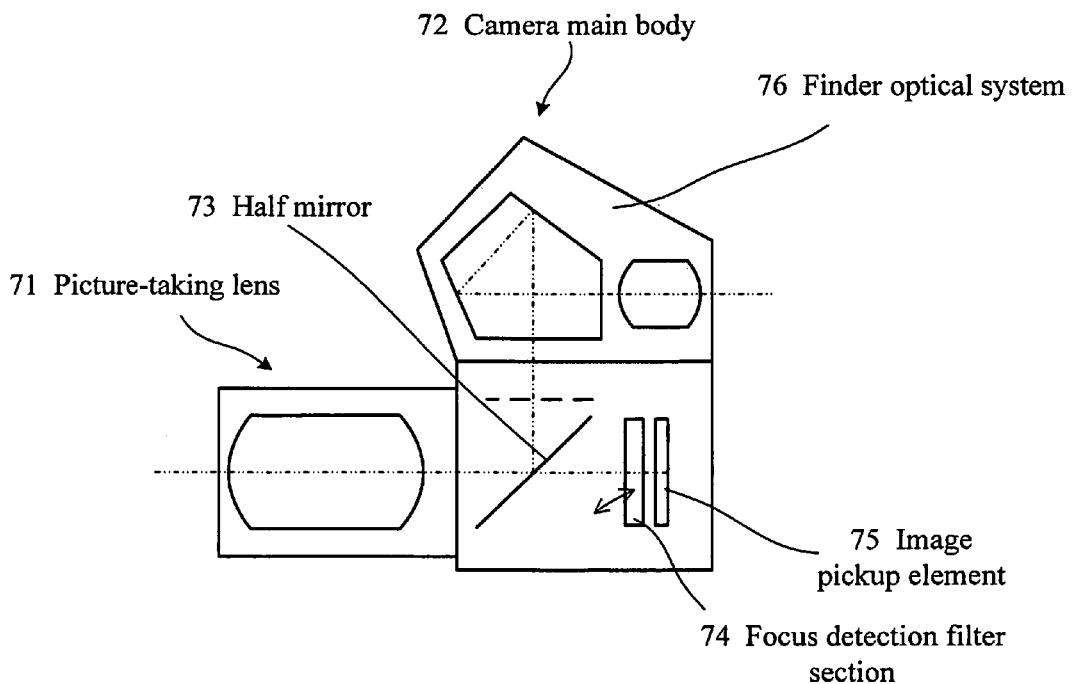
FIG. 14 is a diagram illustrating an example of how components are mounted on an image pickup device.

In an image pickup device illustrated in FIG. 14, a half mirror is disposed to divide an optical path into two, one of which heads for an image pickup element and the other for a finder. Furthermore, the image pickup device includes a focus detection filter section disposed near an image pickup element 75's one side, which is closer to an object than the other side. The focus detection filter section enters an optical path when a focus is detected and withdraws from the optical path when a picture is taken. It is desirable that the focus detection filter slide in a direction perpendicular to the plane of paper when withdrawing from the optical path, because the direction does not make a great impact on the size and shape of the entire body. Thanks to the above configuration, framing is possible even when a focus is detected and when a picture is taken.

Figure 15:
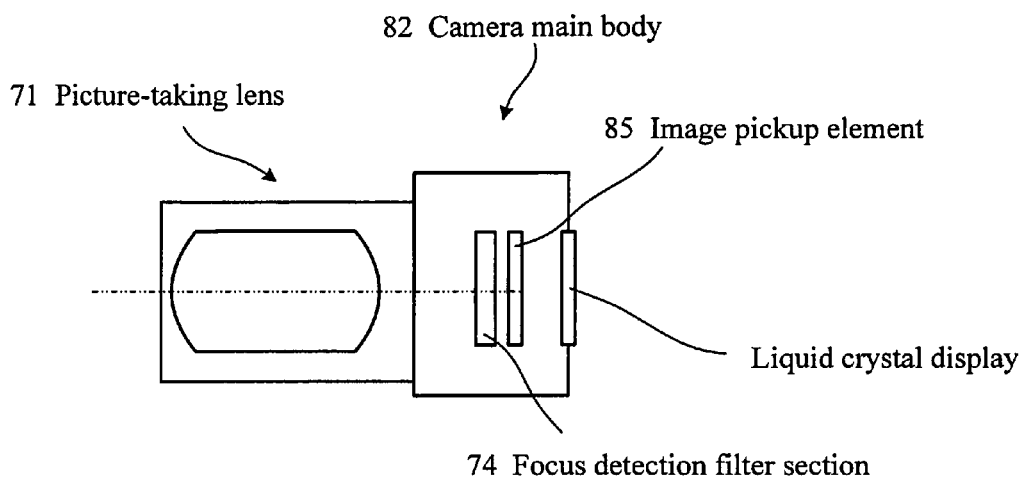
FIG. 15 is a diagram illustrating an example of how components are mounted on an image pickup device.
Figure 16:
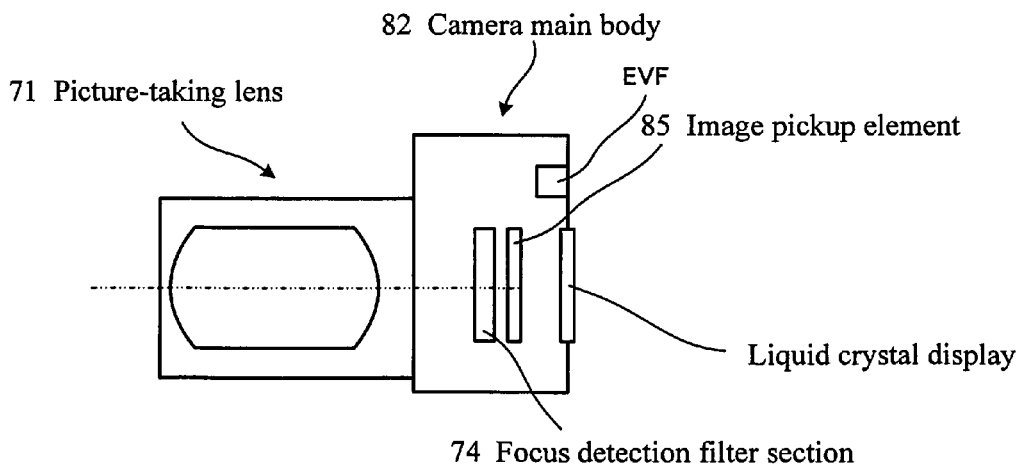
FIG. 16 is a diagram illustrating an example of how components are mounted on an image pickup device.

In an image pickup device illustrated in FIG. 15, the output from an image pickup element is displayed on a liquid crystal display on the back side of a body, and framing is possible. FIG. 16 shows an image pickup device that includes, along with the configuration illustrated in FIG. 15, EVF by which framing is performed while a display element is observed through an eye lens. In each case, a focus detection filter section is disposed near an image pickup element 75's one side, which is closer to an object than the other side. The focus detection filter section enters an optical path when a focus is detected and withdraws from the optical path when a picture is taken. A sufficient number of field openings of the focus detection filter (preferably more than or equal to 7,500) and a sufficient number of pixels of the image pickup element (36 or more times as many as the number of the field openings) make framing possible even when a focus is detected and when a picture is taken. Since there is no optical path division mirror, such as a quick return mirror, for the finder, the body is made thinner. Moreover, since the F back (a distance from the last lens of the picture-taking lenses to the image pickup plane) of the picture-taking lens can be shortened, the structure of the picture-taking lens can be simplified.

What is claimed is:

1. An image pickup device comprising:
   a picture-taking lens;
   an image pickup element that receives light of an object image formed by the picture-taking lens; and
   a focus detection filter section,
   the focus detection filter section, from the side of the picture-taking lens in the following order, including:
   a field diaphragm that includes a plurality of first openings;
   a condenser lens disposed near the field diaphragm;
   a pupil division diaphragm that includes a plurality of second openings arranged at such intervals as to secure focusing accuracy; and
   a re-imaging lens group that includes a plurality of re-imaging lenses that are so arranged as to correspond to the second openings,
   the field diaphragm being disposed at a substantially conjugated position with the image pickup element,
   a plurality of the first openings being so formed as to allow two light beams that each pass through different areas of the picture-taking lens to enter the different re-imaging lenses after passing through the different first openings,
   the focus detection filter section being so disposed near the image pickup element and on an optical path between the picture-taking lens and the image pickup element as to be able to be inserted and withdrawn, and
   the focus detection filter section being inserted into the optical path when a focus is detected and being withdrawn from the optical path when a picture is taken.

2. The image pickup device according to claim 1, wherein:
   the field diaphragm includes at least the n (n≧2) first openings arranged side by side;
   the re-imaging lens group includes the n+1 re-imaging lenses;
   the n−1th and nth re-imaging lenses correspond to the n−1th first opening and are a pair of re-imaging lenses arranged side by side;
   the nth and n+1th re-imaging lenses correspond to the nth first opening and are a pair of re-imaging lenses arranged side by side; and
   the n−1th re-imaging lens and the n+1 re-imaging lens are disposed at different positions.

3. The image pickup device according to claim 2, comprising
   another field diagram that is different from the field diaphragm, wherein
   the another diaphragm includes at least n (n≧2) first openings arranged side by side, and the field diaphragm and the another field diaphragm are arranged in parallel to each other.

4. The image pickup device according to claim 1, comprising another field diagram that is different from the field diaphragm, wherein
   the another diaphragm includes at least n (n≧2) first openings arranged side by side, and the field diaphragm and the another field diaphragm are so arranged as to cross each other at right angles.

5. The image pickup device according to claim 1, wherein an image of the first opening projected by the re-imaging lens on the image pickup element does not interfere with an image of the other first opening when a focus is detected.

6. The image pickup device according to claim 1, wherein:
   the focus detection filter section is a member in the shape of a plate; and
   a space between the condenser lens and the re-imaging lens group is filled with a transparent material.

7. The image pickup device according to claim 1, wherein:
   the image pickup element includes a color filter having at least three colors; and
   the size of an image of the field diaphragm projected on the image pickup element includes the size of the color filter having at least three colors.

8. The image pickup device according to claim 1, wherein the detecting of focus is performed by selectively using output signals from the image pickup element in accordance with a positional correlation between the focus detection filter section and the image pickup element when a focus is detected.

9. The image pickup device according to claim 1, comprising
   a display for displaying, wherein
   the output from the image pickup element is displayed on the display both when the focus detection filter section is inserted into the optical path and when the focus detection filter section is withdrawn from the optical path.

* * * * *